United States Patent
Jang

(10) Patent No.: US 11,489,798 B2
(45) Date of Patent: Nov. 1, 2022

(54) METHODS AND SYSTEMS FOR PROVIDING EFFICIENT MULTIMEDIA MESSAGE DEPENDING ON USER CONTEXT INFORMATION IN MESSENGER SERVICE

(71) Applicant: LINE Plus Corporation, Seongnam-si (KR)

(72) Inventor: Hyukjae Jang, Seongnam-si (KR)

(73) Assignee: LINE PLUS CORPORATION, Gyeonggi-Do (KR)

(*) Notice: Subject to any disclaimer, the term of this patent is extended or adjusted under 35 U.S.C. 154(b) by 320 days.

(21) Appl. No.: 16/367,853

(22) Filed: Mar. 28, 2019

(65) Prior Publication Data

US 2019/0306098 A1 Oct. 3, 2019

(30) Foreign Application Priority Data

Mar. 29, 2018 (KR) .................. 10-2018-0036776

(51) Int. Cl.
- *G06F 15/16* (2006.01)
- *H04L 51/10* (2022.01)
- *H04L 67/1097* (2022.01)

(52) U.S. Cl.
CPC .......... *H04L 51/10* (2013.01); *H04L 67/1097* (2013.01)

(58) Field of Classification Search
CPC ... H04L 51/063; H04L 51/10; H04L 67/1097; H04L 67/327
See application file for complete search history.

(56) References Cited

U.S. PATENT DOCUMENTS

| | | | |
|---|---|---|---|
| 2007/0213077 A1* | 9/2007 | Mian | H04W 4/18 455/466 |
| 2008/0090553 A1* | 4/2008 | Wan | H04M 3/5315 455/413 |
| 2012/0259926 A1* | 10/2012 | Lockhart | H04L 51/10 709/206 |
| 2015/0304256 A1* | 10/2015 | Rosen | H04L 51/34 709/206 |
| 2019/0268289 A1* | 8/2019 | Brown | H04L 63/0407 |

FOREIGN PATENT DOCUMENTS

| | | |
|---|---|---|
| KR | 10-2006-0039497 A | 5/2006 |
| KR | 10-2007-0028993 A | 3/2007 |
| KR | 10-0874024 B1 | 12/2008 |
| KR | 10-2017-0021174 A | 2/2017 |

* cited by examiner

Primary Examiner — Normin Abedin
(74) Attorney, Agent, or Firm — Harness, Dickey & Pierce, P.L.C.

(57) ABSTRACT

Provided is a method performed by a computer apparatus for providing a multimedia message including receiving a request for transmitting a multimedia message to a receiver terminal from a sender terminal, determining a first context by analyzing first contextual information collected from each of the sender terminal and the receiver terminal, determining a first type of data to be received from the sender terminal and a second type of data to be transmitted to the receiver terminal based on the determined first context, both the first type of data and the second type of data being based on original multimedia data included in the multimedia message, and processing the request for transmitting the multimedia message by receiving the determined first type of data from the sender terminal, and transmitting the determined second type of data to the receiver terminal.

20 Claims, 13 Drawing Sheets

METHODS AND SYSTEMS FOR PROVIDING EFFICIENT MULTIMEDIA MESSAGE DEPENDING ON USER CONTEXT INFORMATION IN MESSENGER SERVICE

CROSS-REFERENCE TO RELATED APPLICATION(S)

This U.S. non-provisional application claims the benefit of priority under 35 U.S.C. § 119 to Korean Patent Application No. 10-2018-0036776 filed on Mar. 29, 2018, in the Korean Intellectual Property Office (KIPO), the entire contents of which are incorporated herein by reference.

BACKGROUND

Field

One or more example embodiments relate to methods and systems for efficiently providing a multimedia message based on a user context in a messenger service, and more particularly, to multimedia message providing methods that may further efficiently transmit, receive, and/or display a multimedia message based on a context of each of a sender and a receiver of a message in a messenger service, computer apparatuses to perform the multimedia message providing methods, and non-transitory computer-readable storage media storing instructions that, when executed by at least one processor, cause the at least one processor to perform the multimedia message providing methods on the computer apparatuses in conjunction with the computer apparatuses.

Description of Related Art

In recent messenger services, users may exchange various types of multimedia message, for example, photos, videos, and voice recordings, instead of simply exchanging text messages. For example, in some mobile multimedia messenger service methods, users are enabled to exchange multimedia data including images or videos captured through a camera in real time during a messenger service using a mobile multimedia instant messenger service system.

However, in the case of such multimedia messages, a single message has a size ranging, for example, from hundreds of kilobytes (KBs) to tens of megabytes (MBs), which is relatively large compared to text messages. Accordingly, in a region or a country with a poor network situation (e.g., a network connection having a low data rate), a relatively large amount of time is used to transmit and/or receive a multimedia message. Alternatively, it may be impossible to transmit and/or receive the multimedia message.

SUMMARY

One or more example embodiments provide a multimedia message providing method that may further efficiently transmit, receive, and/or display a multimedia message based on a context of each of a sender and a receiver of a message in a messenger service, a computer apparatus to perform the multimedia message providing method, and a non-transitory computer-readable storage medium storing instructions that, when executed by a processor, cause the processor to perform the multimedia message providing method on the computer apparatus in conjunction with the computer apparatus.

According to an aspect of at least one example embodiment, there is provided a method performed by a computer apparatus for providing a multimedia message, the method including receiving a request for transmitting a multimedia message to a receiver terminal from a sender terminal; determining a first context by analyzing first contextual information collected from each of the sender terminal and the receiver terminal; determining a first type of data to be received from the sender terminal and a second type of data to be transmitted to the receiver terminal based on the determined first context, both the first type of data and the second type of data being based on original multimedia data included in the multimedia message; and processing the request for transmitting the multimedia message by receiving the determined first type of data from the sender terminal, and transmitting the determined second type of data to the receiver terminal.

The collected contextual information may include at least two of a network state of the sender terminal, a network state of the receiver terminal, whether a receiver user is using the receiver terminal, accessibility of the receiver terminal, intensity of use immersion of the receiver user, or an original copy request received from the receiver terminal in response to an explicit input of the receiver user.

The first type of data may include one of the original multimedia data or a preview of the original multimedia data, the second type of data includes one of an event notification, the original multimedia data, or the preview of the original multimedia data, and the first type of data and the second type of data are different.

The multimedia message providing method may further include determining a second context by analyzing second contextual information collected from each of the sender terminal and the receiver terminal after the determining the first context; changing the first type of data to a third type of data or the second type of data to a fourth type of data in response to determining the second context is different from the first context; and performing at least one of receiving the third type of data from the sender terminal, or transmitting the fourth type of data to the receiver terminal.

The processing of the request may include receiving the original multimedia data from the sender terminal as the first type of data; storing the original multimedia data; generating a preview of the original multimedia data; transmitting the generated preview to the receiver terminal as the second type of data; and transmitting the stored original multimedia data to the receiver terminal as the fourth type of data in response to determining the second context is different from the first context based on receiving an original copy request from the receiver terminal corresponding to the transmitted preview.

The processing of the request may include receiving a preview of the original multimedia data as the first type of data from the sender terminal; transmitting the preview to the receiver terminal as the second type of data; receiving the original multimedia data from the sender terminal as the third type of data in response to determining the second context is different from the first context based on receiving an original copy request from the receiver terminal corresponding to the transmitted preview; and transmitting the received original multimedia data to the receiver terminal as the fourth type of data.

The processing of the request may include transmitting an event notification to the receiver terminal as the second type of data, the event notification corresponding to the multimedia message; determining that the event notification has been displayed through a message application installed on the receiver terminal; receiving one of a preview of the original multimedia data or the original multimedia data as the first type of data from the sender terminal in response to the determining that the event notification has been displayed; and transmitting one of the preview or the original multimedia data to the receiver terminal as the fourth type of data in response to determining the second context is different from the first context based on the determining that the event notification has been displayed.

The receiving of one of the preview or the original multimedia data and the transmitting the same to the receiver terminal may include determining a third context by analyzing third contextual information collected from each of the sender terminal and the receiver terminal after the determining the second context; changing the third type of data to a fifth type of data or the fourth type of data to a sixth type of data in response to determining the third context is different from the second context, the third type of data being the preview, and the fourth type of data being the preview; receiving the original multimedia data from the sender terminal as the fifth type of data in response to determining the third context is different from the second context based on determining an original copy request from the receiver terminal corresponding to the transmitted preview has been received from the receiver terminal; and transmitting the received original multimedia data to the receiver terminal as the sixth type of data.

The multimedia message providing method may further include determining whether the second type of data has previously been transmitted to the receiver terminal based on transmission history data; and transmitting an identifier of the second type of data or an identifier of a message previously used to transmit the second type of data to the receiver terminal in response to determining the second type of data has previously been transmitted to the receiver terminal based on the transmission history data, wherein the transmitted identifier of the second type of data or the transmitted identifier of the message enables the receiver terminal to identify data previously transmitted to and stored in the receiver terminal.

According to an aspect of at least one example embodiment, there is provided a multimedia message providing method including transmitting, by a sender terminal to a messenger server, a request for transmitting a multimedia message to a receiver terminal; transmitting, by the sender terminal to the messenger server, first contextual information; and transmitting, by the sender terminal to the messenger server, a first type of data based on original multimedia data included in the multimedia message, the first type of data being requested by the messenger server based on a context determined by the messenger server based on the transmitted first contextual information and second contextual information received from the receiver terminal.

According to an aspect of at least one example embodiment, there is provided a non-transitory computer-readable storage medium storing instructions that, when executed by at least one processor, cause the at least one processor to perform the multimedia message providing method.

According to an aspect of at least one example embodiment, there is provided a computer apparatus including at least one processor configured to execute computer-readable instructions. The at least one processor is configured to receive a request for transmitting a multimedia message to a receiver terminal from a sender terminal, determine a context by analyzing contextual information collected from each of the sender terminal and the receiver terminal, determine a first type of data to be received from the sender terminal and a second type of data to be transmitted to the receiver terminal based on the determined context, both the first type of data and the second type of data being based on original multimedia data included in the multimedia message, and process the request for transmitting the multimedia message by receiving the determined first type of data from the sender terminal, and transmitting the determined second type of data to the receiver terminal.

According to an aspect of at least one example embodiment, there is provided a computer apparatus including at least one processor of a sender terminal configured to execute computer-readable instructions. The at least one processor is configured to transmitting, by the sender terminal to a messenger server, a request for transmitting a multimedia message to a receiver terminal; transmitting, by the sender terminal to the messenger server, first contextual information, the messenger server being configured to determine a context based on the first contextual information and second contextual information received from the receiver terminal; and transmitting, by the sender terminal to the messenger server, a first type of data based on original multimedia data included in the multimedia message, the first type of data being requested by the messenger server based on the context.

According to some example embodiments, it is possible to further efficiently transmit, receive, and/or display a multimedia message based on a context of each of a sender and a receiver of a message in a messenger service.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Some example embodiments will be described in more detail with regard to the figures, wherein like reference numerals refer to like parts throughout the various figures unless otherwise specified, and wherein.

DETAILED DESCRIPTION

Figure 1:
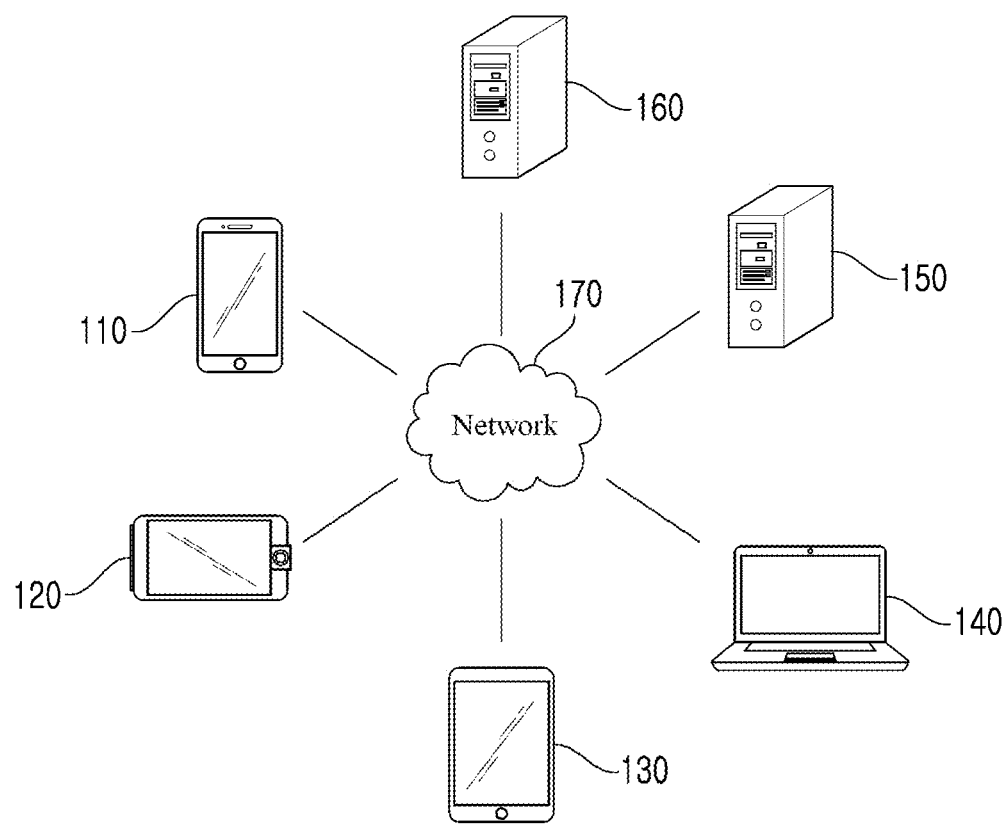
FIG. 1 illustrates an example of a network environment according to at least one example embodiment.

One or more example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously or contemporaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the some example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of some example embodiments, or they may be known devices that are altered and/or modified for the purposes of some example embodiments.

A hardware device, such as a computer processing device, may run an operating system (OS) and one or more software applications that run on the OS. The computer processing device also may access, store, manipulate, process, and e data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A multimedia message providing method according to some example embodiments may be implemented through a computer apparatus, such as an electronic device or a server, which is described below. Here, a computer program according to some example embodiments may be installed and executed on the computer apparatus. The computer apparatus may perform the multimedia message providing method according to the some example embodiments under control of the executed computer program. The computer program may be stored in a non-transitory computer-readable storage medium to perform the multimedia message providing method on the computer apparatus in conjunction with the computer apparatus.

FIG. 1 is a diagram illustrating an example of a network environment according to at least one example embodiment. Referring to FIG. 1, the network environment includes a plurality of electronic devices 110, 120, 130, and/or 140, a plurality of servers 150 and/or 160, and/or a network 170. FIG. 1 is provided as an example only and thus, a number of electronic devices and/or a number of servers are not limited thereto.

Each of the plurality of electronic devices 110, 120, 130, and/or 140 may be a fixed terminal or a mobile terminal configured as a computer apparatus. For example, the plurality of electronic devices 110, 120, 130, and/or 140 may be a smartphone, a mobile phone, a navigation, a computer, a laptop computer, a digital broadcasting terminal, a personal digital assistant (PDA), a portable multimedia player (PMP), and/or a tablet personal computer (PC). For example, although FIG. 1 illustrates a shape of a smartphone as an example of the electronic device 110, the electronic device 110 may refer to one of various physical computer apparatuses capable of communicating with other electronic devices 120, 130, and/or 140, and/or the servers 150 and/or 160 over the network 170 in a wired communication manner and/or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and/or the like. However, it is only an example and some example embodiments are not limited thereto.

Each of the servers 150 and/or 160 may be configured as a computer apparatus or a plurality of computer apparatuses that provides instructions, codes, files, contents, services, and/or the like through communication with the plurality of electronic devices 110, 120, 130, and/or 140 over the network 170. For example, the server 150 may be a system that provides a service, for example, a game service, a social network service (SNS), a messaging service, a search service, a mail service, and/or a content providing service, to the plurality of electronic devices 110, 120, 130, and/or 140 over the network 170.

Figure 2:
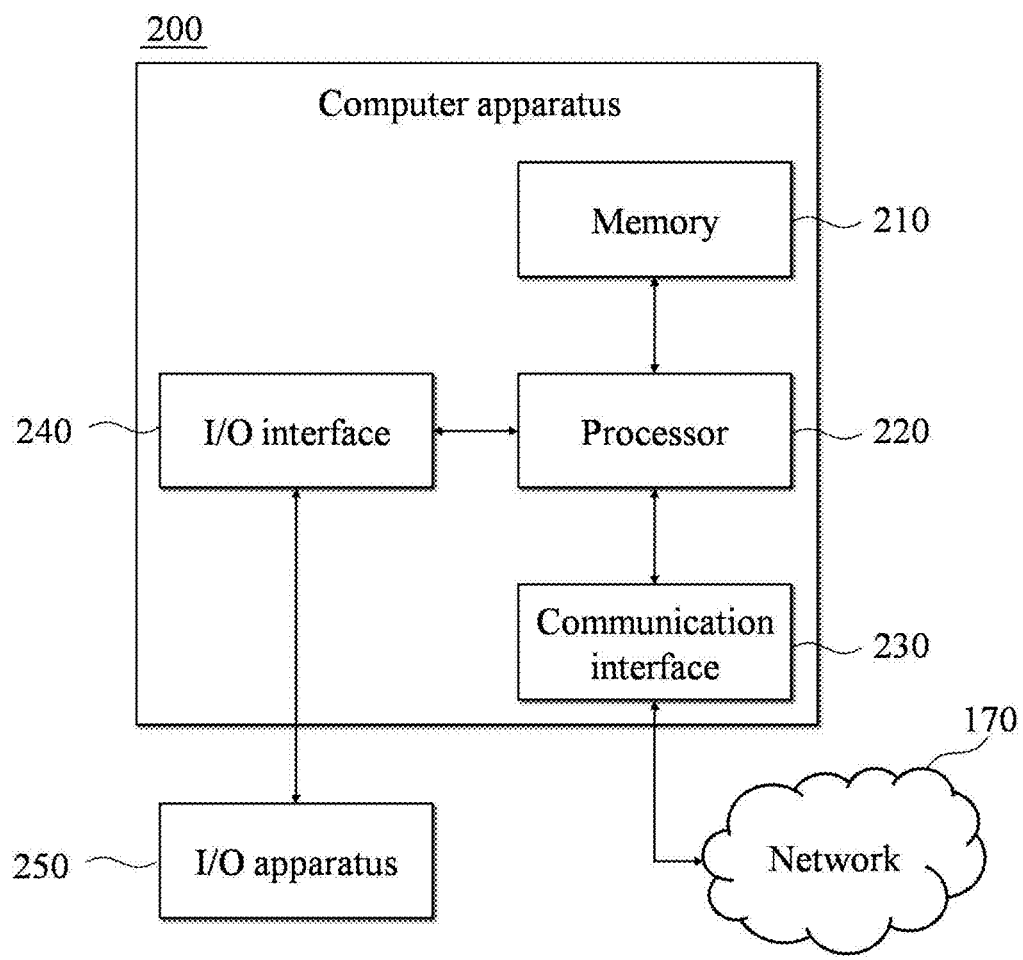
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and/or 140 and/or each of the servers 150 and/or 160 may be configured through a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as random access memory (RAM), read only memory (ROM), and/or a disk drive, as a non-transitory computer-readable storage medium. Here, the permanent mass storage device, such as ROM and/or a disk drive, may be included in the computer apparatus 200 as a permanent storage device separate from the memory 210. Also, an OS and/or at least one program code may be stored in the memory 210. Such software components may be loaded to the memory 210 from another non-transitory computer-readable storage medium separate from the memory 210. The other non-transitory computer-readable storage medium may include a non-transitory computer-readable storage medium, for example, a floppy drive, a disk, a tape, a DVD/CD-ROM drive, a memory card, etc. According to some example embodiments, software components may be loaded to the memory 210 through the communication interface 230, instead of, or in addition to, the non-transitory computer-readable storage medium. For example, software components may be loaded to the memory 210 of the computer apparatus 200 based on a computer program installed by files provided over the network 170.

The processor 210 may be configured to process computer-readable instructions of a computer program by performing basic arithmetic operations, logic operations, and/or I/O operations. The computer-readable instructions may be provided from the memory 210 and/or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage device, over the network 170. For example, the processor 220 of the computer apparatus 200 may transfer a request or an instruction, generated based on a program code stored in the storage device such as the memory 210, to other devices over the network 170 under control of the communication interface 230. Inversely, a signal, an instruction, data, a file, etc., from another apparatus may be received at the computer apparatus 200 by going through the communication interface 230 of the computer apparatus 200 and the network 170. For example, a signal, an instruction, data, etc., received through the communication interface 230 may be transferred to the processor 220 or the memory 210, and a file, etc., may be stored in a storage medium, for example, the aforementioned permanent storage device, further includable in the computer apparatus 200.

The I/O interface 240 may be a device used for interface with an I/O apparatus 250. For example, an input device may include a device, such as a microphone, a keyboard, and/or a mouse, and an output device may include a device, such as a display and/or a speaker. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to some example embodiments, the computer apparatus 200 may include a number of components greater than or less than a number of components shown in FIG. 2. For example, the computer apparatus 200 may include at least a portion of the I/O apparatus 250, and/or may further include other components, for example, a transceiver, a database (DB), and/or the like.

In each of uses terminals of a messenger service, such as the plurality of electronic devices 110, 120, 130, and/or 140, a network state and a phone use stage suddenly vary in real time. Therefore, it may become an issue to transmit, receive and/or display multimedia data between users.

For example, although a receiver with a poor network state downloads multimedia data, for example, a video, included in a multimedia message using a relatively large amount of time and cost (data), contents of the multimedia data may include data not currently desired by a receiver user to be downloaded at a current point in time.

As another example, although a network state is relatively good at a point in time at which a multimedia message is received, a receiver may not download multimedia data included in the multimedia message. At a point in time at which the receiver desires to download the multimedia data after a determined period of time is elapsed, the network state may become poor and the receiver may not download the multimedia data.

As another example, although a sender transmits a multimedia message, a receiver may be in a situation in which the receiver is incapable of verifying the multimedia message. In this case, under a slow network state, the sender may transmit the multimedia message itself, however, even when the large multimedia data included in the multimedia message is not currently desired by a receiver user. Conventional multimedia message servers, terminals and/or systems transfer multimedia data between terminals without consideration of the changing network states of the terminals or a changing degree of urgency for transferring the multimedia data to a receiving terminal. As a result, the conventional multimedia message servers, terminals and/or systems transfer an unnecessarily large amount of the multimedia data under disadvantageous circumstances (e.g., when the network state is poor and/or the user of the receiving terminal is not using the receiving terminal) causing unnecessary delay and/or reduced multimedia quality, and/or excessive resource consumption (e.g., processor, memory, bandwidth and/or power) in periods of low resource availability (e.g., when the network state is poor).

However, some example embodiments provide improved multimedia message servers, terminals and/or systems configured to efficiently transmit, receive, and/or display a multimedia message by collectively analyzing a network state, a terminal use state of a user, and/or contexts of members that join a conversation, in order to cope with various types of contexts. Accordingly, some example embodiments overcome the above-described disadvantages of the conventional multimedia message servers, terminals and/or systems to reduce delay and/or increase multimedia quality, and/or reduce resource consumption during periods of low resource availability.

Figure 3:
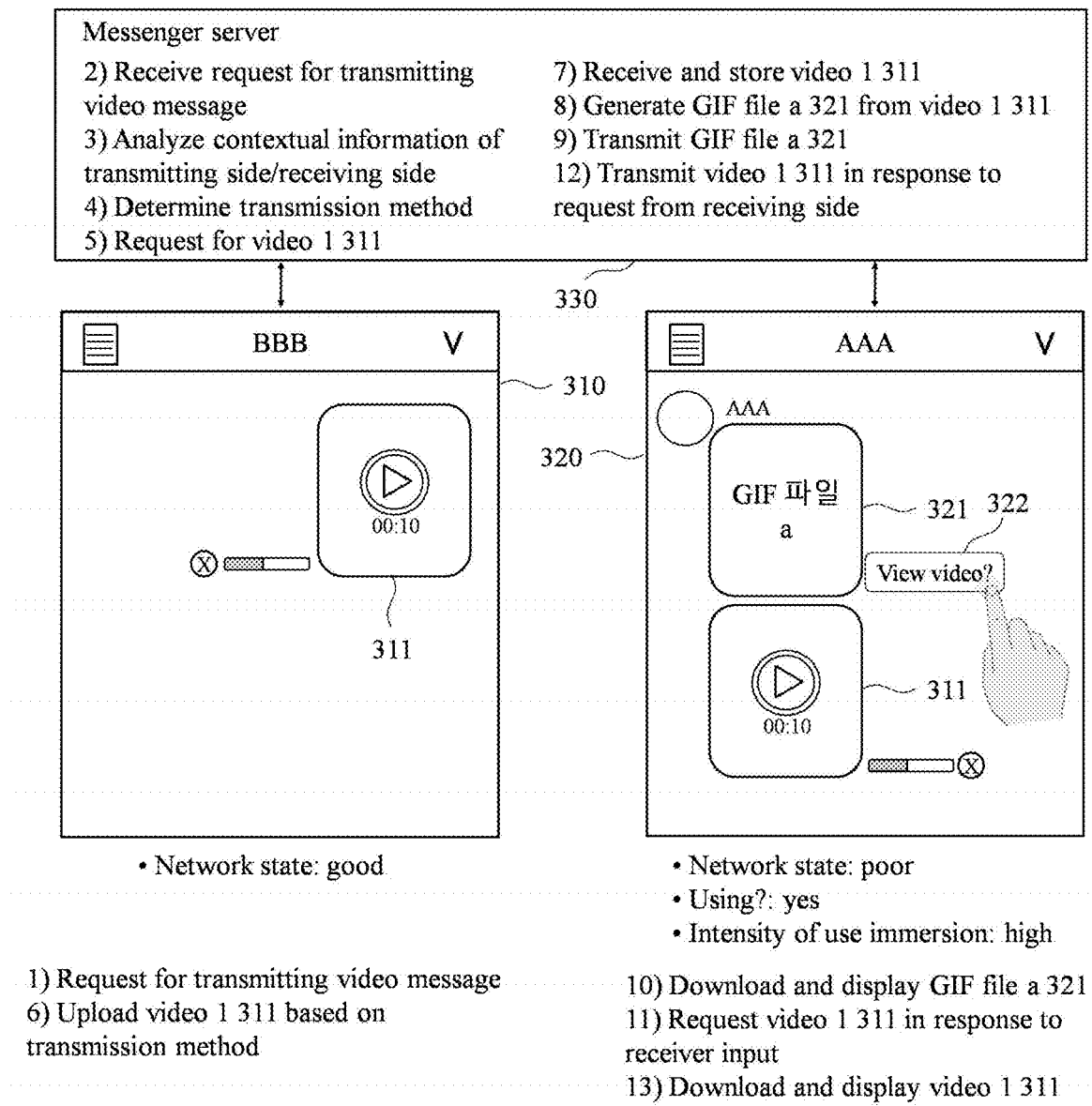
FIG. 3 illustrates an example of providing a multimedia message according to at least one example embodiment.

FIG. 3 illustrates an example of providing a multimedia message according to at least one example embodiment. Hereinafter, an example in which a sender terminal 310 with a relatively good network state transmits a multimedia message including multimedia data, for example, a video to a receiver terminal 320 with a relatively poor network state through a messenger server 330 will be described with reference to FIG. 3. Here, it is assumed that a receiver is using the receiver terminal 320 and intensity of use immersion is high. Referring to FIG. 3, although the sender terminal 310 and the receiver terminal 320 are provided as screens, they may be physical apparatuses on each of which a messenger application is installed and executed and that exchange messages through communication with the messenger server 330 over the network 170. The sender terminal 310 and the receiver terminal 320 may each be implemented by the computer apparatus 200 of FIG. 2. The messenger server 330 may be at least one physical apparatus configured to support a transmitting side corresponding to the sender terminal 310 and a receiving side corresponding to the receiver terminal 320 to exchange messages by establishing a communication session between the sender terminal 310 and the receiver terminal 320 on each of which the messenger application runs and by routing messages transmitted and/or received between the sender terminal 310 and the receiver terminal 320 through the established communication session. Here, an apparatus that implements the messenger server 330 may also be configured by the computer apparatus 200 of FIG. 2. The communication session described herein may be established between an account of the sender and an account of the receiver that are users of the sender terminal 310 and the receiver terminal 320, respectively, and may correspond to a chatroom in a messenger environment. Although an example of a process of transmitting and receiving a multimedia message between two users, that is, the sender and the receiver is described with reference to FIG. 3, the similar processes may apply to a group chatroom in which a single sender and two or more receivers are present. Here, a method of transmitting a multimedia message may vary for each receiver based on different contexts of the receivers. Also, transmitting, uploading, receiving, and/or downloading signals, requests, messages, and/or data among the sender terminal 310, the receiver terminal 320, and the messenger server 330 in the following may be performed through the network 170.

1) Request for Transmitting Video Message:

When the sender terminal 310 with a good network state (e.g., a relatively high signal-to-noise ratio, and/or a relatively high data rate, regarding signals received over the network) selects a video 1 311 through a function provided from the messenger application and requests the messenger server 330 to transmit a multimedia message, the sender terminal 310 may transmit a signal, for example, an event (e.g., a notification event and/or event notification), for requesting transmitting of the multimedia message to the messenger server 330 under control of the messenger application.

2) Receive Request for Transmitting Video Message:

The messenger server 330 may receive the signal that is transmitted from the sender terminal 310 over the network. Here, the signal refers to a signal used to notify that the sender terminal 310 is to transmit the multimedia message and does not include multimedia data itself.

3) Analyze Contextual Information of Transmitting Side/Receiving Side:

In response to receiving the signal, the messenger server 330 may analyze contextual information of each of the sender terminal 310 and the receiver terminal 320. The contextual information may use information that is periodically collected in advance, and may be acquired in real time by transmitting a specific signal to the sender terminal 310 and the receiver terminal 320 in response to receiving the signal. Also, both methods may be used. Contents included in the contextual information and a method of acquiring and analyzing the contextual information will be further described below. Here, as a result of analyzing contextual information of each of the sender terminal 310 and the receiver terminal 320, the messenger server 330 may determine that the network state of the sender terminal 310 is 'good', for example, a first grade between two defined grades such as 'good' and 'poor', and the network state of the receiver terminal 320 is poor (e.g., a relatively low signal-to-noise ratio, and/or a relatively low data rate, regarding signals received over the network), as assumed in FIG. 3. Also, the messenger server 330 may determine that the receiver corresponding to the user of the receiver terminal 320 is using the receiver terminal 320 and intensity of use immersion is 'high', for example, a first grade between two determined grades, such as 'high' and 'low'. The network state and the intensity of use immersion may be classified into three or more grades.

4) Determine Transmission Method:

Based on the determined result of analyzing the contextual information, the messenger server 330 may determine a transmission method of the video 1 311 that is to be transmitted from the sender terminal 310 to the receiver terminal 320 with respect to each of the sender terminal 310 and the receiver terminal 320. For example, the messenger server 330 may select a transmission method of immediately or contemporaneously receiving the video 1 311 from the sender terminal 310 with the 'good' network state. On the contrary, the messenger server 330 may select a transmission method of generating and transmitting an animated graphics interchange format (GIF) file a 321 that is a moving photo from the video 1 311 and, in response to an explicit request from the receiver terminal 320, transmitting the video 1 311, instead of immediately or contemporaneously transmitting the video 1 311 to the receiver terminal 320 with the 'poor' network state.

5) Request for Video 1 311:

The messenger server 330 may request the sender terminal 310 to upload the corresponding video 1 311 based on the determined transmission method.

6) Upload Video 1 311 Based on Transmission Method:

In response to a request from the messenger server 330, the sender terminal 310 may request the messenger server 330 for the video 1 311. If another transmission method is determined, the sender terminal 310 may upload the video 1 311 to the messenger server 330 based on the other transmission method. For example, when the network state of the sender terminal 310 is 'poor', a transmission method in which the sender terminal 310 generates a preview of the video 1 311 and transmits the generated preview to the messenger server 330 and transmits the video 1 311 when the network state of the sender terminal 310 becomes good may be determined. Here, the preview may refer to, for example, preview data, such as the animated GIF file a 321. A similar concept may be used even for a sound recording or a sound source, such as music. The some example embodiments related to the sound recording will be further described below.

7) Receive and Store Video 1 311:

The messenger server 330 may receive the video 1 311 uploaded by the sender terminal 310 and may store the video 1 311 in a storage of the messenger server 330.

8) Generate Animated GIF File a 321 from Video 1 311:

The messenger server 330 may generate the animated GIF file a 321 from the received video 1 311. For example, if the large video 1 311 is transmitted to the receiver terminal 320 with the 'poor' network state, it may cause the receiver to receive a message of the sender after a long period of time or to fail in receiving the message of the sender compared to a general context. On the contrary, it is apparent that the animated GIF file a 321 generated from the video 1 311 has a relatively smaller capacity than that of the video 1 311. Accordingly, the receiver may further quickly receive information on transmission of the video 1 311 and may acquire rough information on the video 1 311. A method of generating the animated GIF file a 321 from the video 1 311 will be further described below.

9) Transmit Animated GIF File a 321:

The messenger server 330 may transmit, to the receiver terminal 320, the animated GIF file a 321 that is generated from the video 1 311.

10) Download and Display Animated GIF File a 321:

The receiver terminal 320 may download the animated GIF file a 321 transmitted from the messenger server 330 and may display the downloaded animated GIF file a 321 on a screen. FIG. 3 illustrates an example in which the animated GIF file a 321 is displayed in a chatroom by the receiver terminal 320. By downloading and displaying the animated GIF file a 321, the receiver may further quickly verify that the sender is to transmit a video and may verify rough content of the video to be transmitted. That is, the receiver may determine a download point in time of the video 1 311 through the preview such as the animated GIF file a 321. For example, although the network state is 'poor', the receiver may desire to immediately or contemporaneously download the video 1 311 and may also desire to download the video 1 311 when the network state is changed from 'poor' to 'good'.

11) Request Video 1 311 in Response to Receiver Input.

In response to an explicit input from the receiver, the receiver terminal 320 may request the messenger server 330 for the video 1 311. For example, the animated GIF file a 321 may be displayed with a user interface, such as a button 322 "View video?". In response to the explicit input from the receiver, such as a selection from the receiver on the button 322 "View video?", for example, a touch on the button 322 using a finger in a touchscreen environment, the receiver terminal 320 may request the messenger server 330 for the video 1 311. For example, a link that includes a network position, for example, a uniform resource locator (URL), for the video 1 311 stored in the messenger server 330 may be set to the button 322 "View video?". In response to the selection from the receiver, the receiver terminal 320 may request the messenger server 330 for the video 1 311 that is stored at the network position.

12) Transmit Video 1 311 in Response to Request from Receiving Side:

The messenger server 330 may transmit the corresponding video 1 311 to the receiver terminal 320 in response to a request from the receiver terminal 320.

13) Download and Display Video 1 311:

The receiver terminal 320 may download the video 1 311 from the messenger server 330 and may display the downloaded video 1 311 on the screen. FIG. 3 illustrates an example in which the video 1 311 is displayed on the screen of the receiver terminal 320 through the chatroom. Here, although the network state is 'poor', the receiver may be aware that the video 1 311 is transmitted from the sender even before receiving the video 1 311 and may verify rough content of the video 1 311 in advance from the animated GIF file a 321.

Although an example in which the messenger server 330 relays a transfer of a message between the sender terminal 310 and the receiver terminal 320 is described with reference to FIG. 3, the messenger server 330 may perform only a relay function and an actual transfer of the message may be directly performed between the sender terminal 310 and the receiver terminal 320. For example, the messenger server 330 may control the sender terminal 310 to generate the animated GIF file a 321 and directly transmit the same to the receiver terminal 320, or may control the sender terminal 310 to directly transmit the video 1 311 to the receiver terminal 320. It may be applied to some example embodiments described in the following.

Also, although an example in which the messenger server 330 collects contextual information of each of the sender terminal 310 and the receiver terminal 320 is described with reference to FIG. 3, each of the sender terminal 310 and the receiver terminal 320 may collect the contextual information depending on some example embodiments. For example, each of the sender terminal 310 and the receiver terminal 320 may monitor a current network state with the messenger server 330 and may determine whether it is appropriate to transmit and/or receive various multimedia messages and may estimate a state for a future time based on a result of monitoring the network state. Here, the messenger server 330 may analyze the contextual information collected by each of the sender terminal 310 and the receiver terminal 320 and may determine a multimedia message transmission method for each of the sender terminal 310 and the receiver terminal 320.

Figure 4:
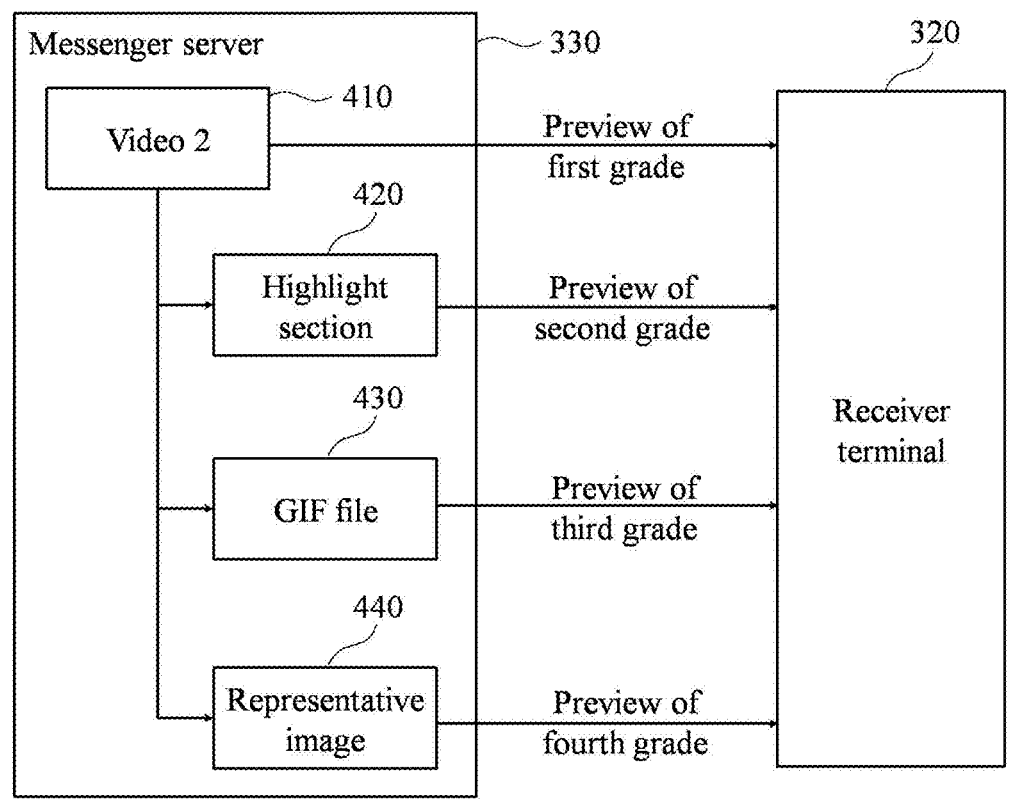
FIG. 4 illustrates an example of a grade and/or a format of a preview according to at least one example embodiment.

FIG. 4 illustrates an example of a grade and/or a format of a preview according to at least one example embodiment. As described above with reference to FIG. 3, the sender terminal 310 and/or the messenger server 330 may generate a preview, such as the animated GIF file a 321, and may provide the generated preview to the receiver terminal 320 to reduce capacity (e.g., data size) of original data and an amount of playtime. The preview may be generated based on various grades and/or formats based on contexts. For example, in the case of a video 2 410, the preview may be generated based on various grades and/or formats based on contexts, such as a first grade preview including the original video 2 410, a second grade preview including a highlight section 420 extracted from the video 2 410, a third grade preview including an animated GIF file 430 that is generated by extracting a desired number of images from the video 2 410, and a fourth grade preview including a single representative image 440 extracted from the video 2 410. For example, although a network state is classified into two grades such as "good" and "poor" in FIG. 3, the network state may be classified into at least three grades such as "good", "average", and "poor", "first grade", "second grade", third grade" and "fourth grade", and the like (e.g., according to a signal-to-noise ratio, and/or a data rate, of signals received over the network). As described above, in addition to the network state, a variety of user contextual information may be used, such as whether the receiver is using the receiver terminal 320, accessibility of the receiver to the receiver terminal 320, and intensity of use immersion of the receiver into the receiver terminal 320. Various multimedia message transmission methods may be defined accordingly and used. Here, a grade and/or a format of the preview may vary based on the multimedia message transmission methods.

In a video, a highlight section may be generated using at least one of various techniques for extracting a highlight section in a video, such as, for example, a method of determining a theme, training a neural network to learn an image based on the determined theme, and extracting a highlight based on the trained neural network and a method of finding and comparing an original video and an edited video for each theme at a website that provides a video service based on a support vector machine (SVM) and finding and training a section with a high similarity in an image.

In some example embodiments, a highlight as a preview of a video may be generated using a highlight extraction method different from a general context, since a plurality of multimedia messages including personal images is transmitted and received due to a characteristic of a messenger service. For example, from perspective of the receiver, a portion in which a face of a friend of the receiver appears in a video may be extracted as a highlight section through a facial recognition based on profile photos of other users, for example, messenger friends of the receiver, having a personal relationship established with the sender or the receiver at the messenger service. In addition, the highlight section may be determined using sound and/or screen shake. For example, a section corresponding to n seconds may be determined as the highlight section based on a point in time at which volume suddenly increases due to shout. As another example, a shooter of a video may find a section in which a screen shakes based on occurrence of a specific event and may extract, as the highlight section, a section from just before the screen shakes until the screen shakes and then becomes stable.

Although an example in which the messenger server 330 generates the preview and provides the preview to the receiver terminal 320 is described above with reference to FIG. 4, the sender terminal 310 may generate the preview and may provide the preview to the receiver terminal 320 through the messenger server 330 depending on some example embodiments. Here, such difference may occur not just because of a change in an entity of generating the preview but because of the network state of the sender terminal 310 and/or the receiver terminal 320, whether the receiver terminal 320 is available, and the like. For example, when the network state of the sender terminal 310 is 'poor', the network state of the receiver terminal 320 is 'poor', and the receiver is currently using the receiver terminal 320, the sender terminal 310 may generate a preview, upload the generated preview to the messenger server 330, and transmit the preview to the receiver terminal 320 and then sequentially may upload the video 2 410 to the messenger server 330 and transmit the video 2 410 to the receiver terminal 320, instead of immediately or contemporaneously uploading the video 2 410 corresponding to original multimedia data to the messenger server 330. In this case, the receiver terminal 320 may roughly verify content of the video 2 410 from the preview that uses relatively small capacity (e.g., memory space and/or data size) and may determine whether to download the video 2 410 and a download point in time. Here, in response to a request from the receiver for downloading the video 2 410, the video 2 410 may be uploaded from the sender terminal 310 to the messenger server 330 and may be provided to the receiver terminal 320 through the messenger server 330.

Figure 5:
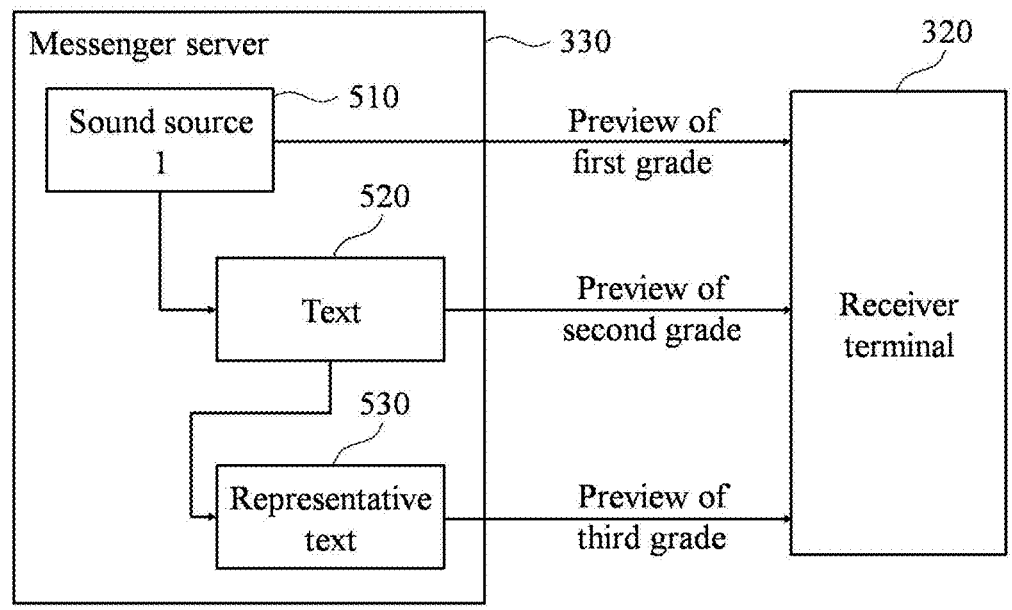
FIG. 5 illustrates another example of a grade and/or a format of a preview according to at least one example embodiment.

FIG. 5 illustrates another example of a grade and/or a format of a preview according to at least one example embodiment. In the case of a sound source 1 510 such as voice recording or music, a preview may be generated based on various grades and/or formats based on contexts, such as a first grade preview including the original sound source 1 510 as is, a second grade preview including a text 520 extracted from the sound source 1 510, and a third grade preview including a representative text 530 extracted from the extracted text 520. As described above, the preview using the various grades and/or formats may be generated by the messenger server 330 or the sender terminal 310 and may be provided to the receiver terminal 320 based on a user context.

Also, in some example embodiments, a sound source edited by extracting the text 520 (e.g., using speech/voice recognition) from the sound source 1 510, by extracting a representative word or text from the text 520, and by extracting only a section corresponding to the representative word or text in the sound source 1 510 may be generated as a preview.

A transmission event input from the sender terminal 310 and transmission of actual multimedia data may be individually processed. For example, FIG. 3 relates to an example in which transmission of a video message is determined by the sender and an upload point in time of the video 1 311 is determined by the messenger server 330. That is, a time at which original multimedia data is to be transmitted may be determined by a server. Also, the sender terminal 310 may transmit only the preview or the event instead of transmitting the original multimedia data based on a transmission method that is determined by the messenger server 330. For example, a method of transmitting original multimedia data from the sender terminal 310 may be determined as one of the following (1) to (4).

(1) Transmission of Original Copy:

The sender terminal 310 may immediately or contemporaneously upload original multimedia data included in a multimedia message to the messenger server 330 in response to transmission of the multimedia message.

(2) Transmission of Event→Transmission of Original Copy:

The sender terminal 310 may transmit only an event for transmitting the multimedia message to the messenger server 330. In response to a request from the messenger server 330, the sender terminal 310 may upload original multimedia data to the messenger server 330. For example, an example in which the sender terminal 310 transmits a signal, for example, an event, for requesting transmission of a multimedia message to the messenger server 330 and transmits original multimedia data in response to a request from the messenger server 330 is described above with reference to FIG. 3.

(3) Transmission of Preview→Transmission of Original Copy:

The sender terminal 310 may generate a preview of original multimedia data to be transmitted and may transmit the preview to the messenger server 330. Subsequently, the sender terminal 310 may upload original multimedia data to the messenger server 330 in response to a request from the messenger server 330.

(4) Transmission of Event→Transmission of Preview→Transmission of Original Copy:

The sender terminal 310 may transmit only an event for transmitting a multimedia message to the messenger server 330. In response to a request from the messenger server 330, the sender terminal 310 may generate a preview of original multimedia data and may transmit the preview to the messenger server 330. The sender terminal 310 may upload original multimedia data to the messenger server 330 in response to a subsequent request from the messenger server 330.

Here, a situation in which the sender terminal 310 generates the preview and a situation in which the messenger server 330 generates the preview may differ from each other. For example, if a network state of the sender terminal 310 is "good", the sender terminal 310 may not necessarily generate the preview and provide the generated preview to the messenger server 330. On the contrary, if the network state of the sender terminal 310 is "poor", it may be desirable for the sender terminal 310 to postpone uploading of original multimedia data until the network state of the sender terminal 310 changes from "poor" to "good". In this case, the sender terminal 310 may postpone uploading of original multimedia data by generating the event or the preview for transmitting the multimedia message and by transmitting the generated event or preview to the messenger server 330 instead of transmitting the original multimedia data. Here, the receiver may verify rough content of the original multimedia data from the preview and then selectively request transmission of the original multimedia data. Therefore, a probability that the sender terminal 310 does not transmit the original multimedia data in a "poor" network state may increase. Also, although the sender terminal 310 transmits the original multimedia data in the "poor" network state, it is possible to guarantee real-time transmission for a multimedia message to some extents since the preview is transmitted to the receiver.

Figure 6:
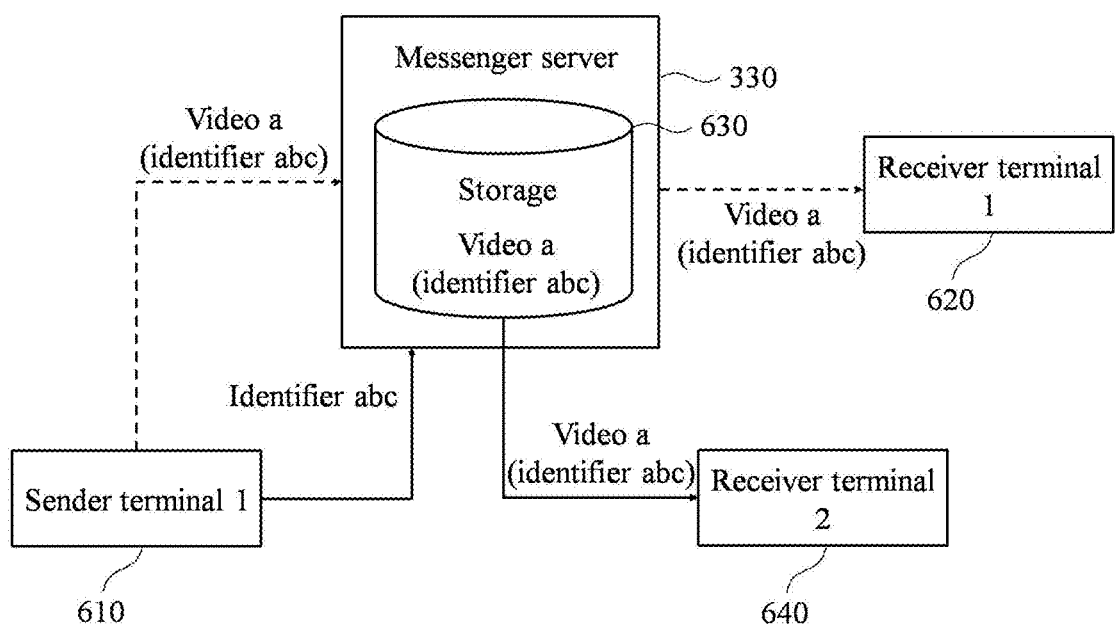
FIG. 6 illustrates an example of a process of preventing or reducing a redundant transmission of transmission data according to at least one example embodiment.

FIG. 6 illustrates an example of a process of preventing or reducing a redundant transmission of transmission data according to at least one example embodiment. Hereinafter, 'transmission data' may refer to a multimedia message, original multimedia data, and/or a preview. Referring to FIG. 6, it is assumed that a sender terminal 1 610 transmits a video a that is identified with an identifier 'abc' as transmission data to a receiver terminal 1 620 through the messenger server 330. Here, transmission of the previously-transmitted video a is represented using an arrow indicator indicated with dotted lines. Here, the video a may be stored in a storage 630 of the messenger server 330 during a desired period of time.

With this assumption, the sender terminal 1 610 may desire to transmit the video a to the receiver terminal 2 640. Here, the sender terminal 1 610 may verify a history that the video a has been previously transmitted from a transmission history for videos. In this case, the sender terminal 1 610 may transmit the identifier 'abc' of the video a to the messenger server 330 instead of retransmitting the video a. Here, the messenger server 330 may search a storage 630 for the video a using the received identifier 'abc' and may transmit the retrieved video a to a receiver terminal 2 640. In FIG. 6, transmission of the video a using the identifier 'abc' is represented using an arrow indicator indicated with a solid line. In this case, it is possible to prevent the sender terminal 1 610 from redundantly transmitting the video a or reduce the occurrence of the redundant transmission, which may lead to reducing data transmission cost (e.g., bandwidth, processor usage, memory usage, power consumption and/or delay). When the video a is deleted from the storage 630 due to a related storage period, the messenger server 330 may request the sender terminal 1 610 to retransmit the video a using the identifier 'abc'.

Likewise, the messenger server 330 may reduce data transmission cost (e.g., bandwidth, processor usage, memory usage, power consumption and/or delay) occurring when the receiver terminal 1 620 or the receiver terminal 2 640 redundantly receives the multimedia message.

Figure 7:
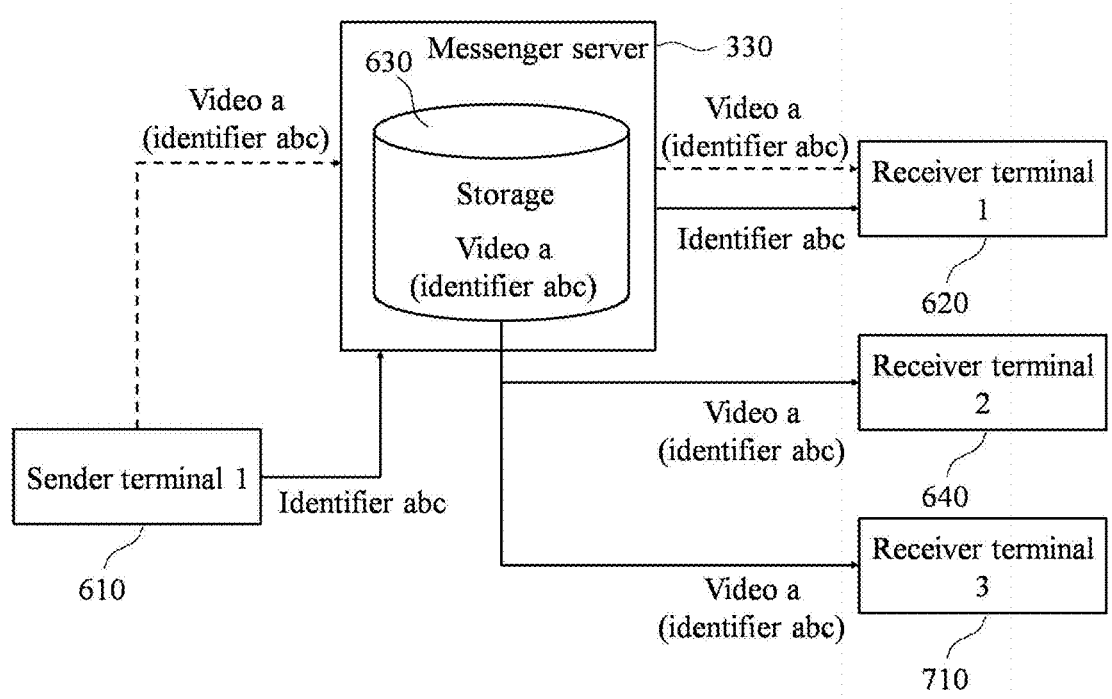
FIG. 7 illustrates another example of a process of preventing or reducing a redundant transmission of transmission data according to at least one example embodiment.

FIG. 7 illustrates another example of a process of preventing or reducing a redundant transmission of transmission data according to at least one example embodiment. Some example embodiments for preventing the messenger server 330 from redundantly transmitting transmission data to the receiver terminal 1 620 or reducing the redundant transmission of the transmission data will be described with reference to FIG. 7. To this end, it is assumed that a chatroom 1 corresponding to a communication session established between an account of a sender 1 of the sender terminal 1 610 and an account of a receiver 1 of the receiver terminal 1 620 is present. Also, it is assumed that a chatroom 2 corresponding to a communication session established among the account of the sender 1 of the sender terminal 1 610, the account of the receiver 1 of the receiver terminal 1 620, an account of a receiver 2 of the receiver terminal 2 640, and/or an account of a receiver 3 of a receiver terminal 3 710 is further present.

A situation in which the video a identified at the chatroom 1 with the identifier 'abc' is transmitted from the sender terminal 1 610 to the receiver terminal 1 620 of the chatroom 1 may be considered. In this case, the video a may be transmitted to the receiver terminal 1 620 through the messenger server 330. This process is represented using an arrow indicator indicated with dotted lines in FIG. 7. Here, the video a may be stored in the storage 630 included in the messenger server 330.

A situation in which the sender terminal 1 610 is to transmit the video a identified with the identifier 'abc' through the chatroom 2 may be considered. In this case, similar to the examples discussed in association with FIG. 6, the sender terminal 1 610 may verify a transmission history of the video a from a transmission history of videos and may transmit the identifier 'abc' of the video a to the messenger server 330, instead of retransmitting the video a to the messenger server 330. Here, the messenger server 330 may identify the video a from the storage 630 based on the identifier 'abc'. Meanwhile, the messenger server 330 may desire to transmit the identified video a to each of the receiver terminal 1 620, the receiver terminal 2 640, and/or the receiver terminal 3 710 that are terminals of the receiver 1, the receiver 2, and the receiver 3 joining the chatroom 2. To prevent or reduce the redundant transmission, the messenger server 330 may verify that the video a is previously transmitted to the receiver terminal 1 620 based on the transmission history of the videos. In this case, the messenger server 330 may transmit the video to each of the receiver terminal 2 640 and the receiver terminal 3 710, and may transmit the identifier 'abc' of the video a to the receiver terminal 1 620. The receiver terminal 1 620 may receive the transmitted identifier 'abc', may verify whether the video a corresponding to the identifier 'abc' is stored in the receiver terminal 1 620, and may display the video a through the chatroom 2 when the video a is verified to be stored in the receiver terminal 1 620. Accordingly, the redundant transmission of the video a may be prevented or reduced. On the contrary, when the video a is verified to not be stored, the receiver terminal 1 620 may request the messenger server 330 to download the video a corresponding to the identifier 'abc'.

Some example embodiments in which original multimedia data is transmitted regardless of a user context is described above with reference to FIGS. 6 and 7. The redundant transmission preventing or reducing method according to the examples discussed in association with FIGS. 6 and 7 may be additionally used during a process of determining a method of transmitting original multimedia data depending on the user context as described above with FIGS. 3 to 5. Also, although the identifier 'abc' of the video a is used in FIGS. 6 and 7, an identifier of a message used to transmit the video a may be used. For example, a preview that is previously transmitted and stored may be identified using the identifier of the message used to transmit the preview.

The messenger server 330 may determine a method (transmission content such as a message event, previews in various grades and/or formats, and original multimedia data, and a transmission point in time of the multimedia message) of transmitting the multimedia message based on various contexts of each of the sender terminal 310 and the receiver terminal 320, and may control transmission and reception of the multimedia message between the sender terminal 310 and the receiver terminal 320 based on the determined transmission content and/or transmission point in time. Here, the messenger server 330 may consider the following factors (a) to (d).

(a) Current Network State and/or Estimated Future Network State of Sender/Receiver.

For example, a network state of a specific terminal may be determined and/or estimated by monitoring and recording information as follows:

Information regarding which wireless network the specific terminal is using between WiFi and a mobile network (e.g., cellular network such as a 3rd generation (3G) and/or 4th generation (4G) long-term evolution (LTE) network and/or a global system for mobile communications (GSM) network). For example, the information may be acquired through an event provided from an OS of the specific terminal, such as ANDROID and iOS. In detail, in the case of an OS such as "ANDROID", usage information of the wireless network may be acquired through method "ConnectivityManager".

In the case of an OS such as ANDROID, information on signal intensity of the wireless network, for example, WiFi, used by the specific terminal, may be acquired through method "WifiManager.getConnectionInfo( )".

A data rate measured through connection to a server. For example, the data rate may be acquired by measuring a transmission rate and latency between transmission and reception while periodically exchanging messages with the messenger server 330. Accordingly, the network state of the specific terminal may correspond to one or more of a wireless network the specific terminal is using (e.g., a WiFi network or a mobile network), a signal intensity of the wireless network, and/or a data rate measured through a connection to a server via the wireless network (e.g., a transmission and/or reception data rate and/or latency). For example, a specific terminal using a WiFi network having a high signal intensity and/or a high data rate (e.g., high transmission/reception data rate and low latency) may be determined to have a "good" network state. In another example, a specific terminal using a mobile network having a low signal intensity and/or a low data rate (e.g., low transmission/reception data rate and high latency) may be determined to have a "poor" network state.

(b) Whether the Receiver is Currently Using the Receiver Terminal 320 and/or Estimated Future Use State.

(c) Current Accessibility and/or Future Accessibility of the Receiver to the Receiver Terminal 320.

For example, whether the receiver is using the receiver terminal 320 and the accessibility thereto may be determined and/or estimated by monitoring and recording a use context of the receiver terminal 320. For example, whether the receiver is using the receiver terminal 320 may be determined based on information on an ON/OFF state of a screen, an ON/OFF state of a screen lock, and an app execution state. In detail, in the case of an OS such as ANDROID, information on the ON/OFF state of the screen lock may be determined based on an event, such as "LCD—ON", "LCD—OFF", and "USER—PRESENT". A current use context of the receiver terminal 320 may be determined based on the information. For example, the use context of the receiver terminal 320 may be determined as one of a first use state in which the screen is OFF, a second use state in which the screen is ON and the screen lock is also ON, a third use state in which the screen is ON and the screen lock is OFF, and a fourth use state in which the screen is ON, the screen lock is OFF, and the app is in use.

As another example, the receiver terminal 320 may detect a hand with which the user is using a device. For example, the receiver terminal 320 may provide information on a hand with which the user is using a mobile device through an accelerometer sensor and a gyro sensor. For example, information on one of 'left hand', 'right hand', 'both hands', and 'hold' may be provided. 'Left hand' may indicate that the user is using the mobile device with holding the same using the left hand of the user, 'right hand' may indicate that the user is using the mobile device with holding the same using the right hand of the user, 'both hands' may indicate that the user is using the mobile device with holding the same using both hands, and 'hold' may indicate that the user is using the mobile device without holding the same. For example, in the case of typing with controlling a device with one hand, a direction in which shake or vibration is relatively strong based on a central axis of the device and/or an orientation of the device, that is, Landscape or Portrait, may be verified through the accelerometer sensor and/or gyro sensor. A hand used to hold the device or whether both hands are used to hold the device may be determined by comparing the verification result to a data set that is stored in association with a one-hand device use pattern.

As another example, the receiver terminal 320 may detect position information of the receiver terminal 320. Here, the position information may include position information, for example, an inside of a pocket of clothes the user is wearing, an inside of a bag the user is carrying, or exposed outside, instead of including a geographical position. For example, the mobile device may detect and provide position information of the mobile device using an accelerometer sensor, an illumination sensor, a microphone, and a proximity sensor, and/or the like.

As another example, the receiver terminal 320 may detect geographical position information of the receiver terminal 320. For example, the receiver terminal 320 may acquire and provide geographical position information, such as current latitudinal/longitudinal position information of the mobile device, using a variety of information received from a global positioning system (GPS), WiFi positioning, and/or a base station.

As another example, the receiver terminal 320 may detect a movement state of the user. For example, the movement state may include one of 'stop', 'walk', 'run', 'bus', 'subway', 'vehicle', and/or 'bicycle'. The receiver terminal 320 may acquire information on a movement speed of the mobile device based on a change in a geographical position, for example, latitudinal/longitudinal coordinates, of the mobile device that is provided from information of a GPS, a base station, and/or a WiFi access point (AP) around a wireless telephone network, a measurement value of an accelerometer sensor included in the mobile device, and/or the like. Also, the mobile device may acquire information on a movement state of the user based on the acquired movement speed and/or a vibration of the mobile device or a pattern of the vibration measured using the accelerometer sensor and/or gyro sensor included in the mobile device. Technology for acquiring information on the movement speed or the movement state may be easily understood by those skilled in the art through the known art, for example, 'Google activity recognition API'.

The aforementioned variety of information may be used to determine whether the receiver is currently accessible to the receiver terminal 320.

Also, a future availability of the receiver terminal 320 may be estimated based on recordings about the use context of the receiver terminal 320. For example, a deep learning model may be trained based on recordings about the use context of the receiver terminal 320. Based on the deep learning model that is trained based on a current time and a current use context, a probability (e.g., 15%, 10%, etc.) that the receiver may use the receiver terminal 320 after a set period of time, for example, 1 hour, and/or a probability that the receiver may use an app, for example, a messenger application through the receiver terminal 320 may be estimated.

(d) Current Intensity of Use Immersion and/or Estimated Intensity of Use Immersion of the Receiver into the Receiver Terminal 320

For example, the receiver terminal 320 may calculate and record an amount of time used for the receiver to use the receiver terminal 320 and/or the messenger application based on a current point in time, for example, a present day and/or time zone, and a current place, by using the aforementioned recordings about the use context of the receiver terminal 320 under control of the messenger application. Here, the receiver terminal 320 may calculate the aforementioned intensity of use immersion as a tendency regarding a level of immersion into using the receiver terminal 320 and/or the messenger application based on a current user context, for example, a time and a place, by referring to the recordings. The intensity of use immersion may be calculated using a plurality of grades according to a period of use and a use frequency. In some example embodiments, the current intensity of use of a specific terminal is determined as being based on whether a user is interacting with the terminal, and/or the messenger application, and if so, an amount of time the user has been interacting with the terminal, and/or the messenger application. For example, the current intensity of use of the specific terminal may be determined to be high if the user is interacting with the terminal, and/or messenger application, and has been interacting with the terminal, and/or the messenger application for a relatively long period of time (e.g., longer than a determined and/or defined period of time). In another example, the current intensity of use of the specific terminal may be determined to be low if the user is either not interacting with the terminal, and/or messenger application, or has been interacting with the terminal, and/or the messenger application for a relatively short period of time (e.g., shorter than a determined and/or defined period of time).

In detail, the receiver terminal 320 may record the average use time and the average use frequency per position and time zone in each of blanks through columns and rows of a table. The receiver terminal 320 may calculate the intensity of use immersion based on the average recording of a context (time zone, position) to be estimated. For example, rows of the table may correspond to times at set time intervals, for example, at intervals of 15 minutes, respectively, and columns of the table may correspond to places, for example, coordinates of latitude/longitude of each of positions of a home, an office, a favorite restaurant or café, a route between the home and the office. According to some example embodiments, the intensity of use immersion may be monitored for a specific terminal over a period of time in association with one or more contexts (e.g., a time of day, location, etc.). The monitored intensity of use immersion for the specific terminal may be stored in association with the one or more contexts. The specific terminal may determine an average intensity of use immersion for the one or more contexts based on the stored data and use the average intensity of use immersion to estimate an intensity of use immersion of the specific terminal in the future (e.g., near future). For example, if the specific terminal determines that the average intensity of use immersion is high when the specific terminal is home at 8:00 AM, the specific terminal may estimate that the use immersion will be high in response to determining that the specific terminal is home at 8:00 AM.

For example, the receiver terminal 320 may generate (e.g., determine) contextual information according to the aforementioned (a) to (d) and may provide the contextual information to the messenger server 330. To this end, the receiver terminal 320 may generate values associated with whether the receiver is currently using the receiver terminal 320, the accessibility thereto, and intensity of use immersion and may provide the values to the messenger server 330.

Also, the receiver terminal 320 may transmit an event (e.g., a notification event and/or event notification) for an access of the receiver to a message to the messenger server 330. For example, the receiver terminal 320 may transmit, to the messenger server 330, events according to an action of the receiver, such as an event that the receiver is using the receiver terminal 320, an event that the receiver is using a messenger application on the receiver terminal 320, an event that the receiver opens a chatroom and accordingly, the receiver terminal 320 displays a corresponding multimedia message, and an event that the receiver requests downloading of an original multimedia message through the multimedia message displayed on the receiver terminal 320. Here, the messenger server 330 may determine factors of the aforementioned (b) to (d) based on the events and may use the determined factors to determine a transmission method, for example, transmission content and/or transmission point in time.

Also, based on the determination of the messenger server 330, the receiver terminal 320 may download in advance the original multimedia data without receiving a request from the receiver. For example, although the intensity of use immersion of the receiver into the receiver terminal 320 is relatively low, a network state of the receiver terminal 320 may be good. In this case, the receiver terminal 320 may download in advance original multimedia data from the messenger server 330.

As described above, according to some example embodiments, the messenger server 330 and/or the sender terminal 310 may generate a preview based on a user context, such as a network state, whether a terminal is being used, accessibility, and/or intensity of use immersion, before the receiver receives original multimedia data of a multimedia message transmitted from the sender, and may transmit the preview to the receiver, such that the receiver may be aware of content of the corresponding multimedia message in advance, thereby effectively displaying the multimedia message. The preview may be generated using various grades and/or formats based on a type of original multimedia data and/or the user context. For example, in the case of a video, an animated GIF file including a combination of some frames may be generated as the preview. In the case of a voice recording, a text recognized from a sound source may be generated as the preview. Also, in the case of a photo bundle including a plurality of images, a collage, for example, with a size of 4×4, a thumbnail, or a representative photo, may be generated as the preview. For example, the representative photo may be selected by selecting a unique photo in an image aspect and/or by applying a taste of the user through a photo analysis. When a document file is transmitted as multimedia data, a title of a document and/or a representative sentence in the document or a representative image in the document may be extracted as the preview.

In addition, since the receiver may roughly verify content of the multimedia message through the aforementioned preview, the receiver may directly select a point in time at which original multimedia data included in the multimedia message is to be downloaded. For example, when the receiver terminal 320 is connected to fast WiFi and the receiver is currently using the receiver terminal 320, the receiver terminal 320 may download original multimedia data in advance without receiving a separate input from the receiver and may provide a service such that the receiver may quickly view the entire content of the corresponding multimedia message. On the contrary, when the receiver terminal 320 is connected to a slow 3G network and the receiver is currently using the receiver terminal 320, the receiver terminal 320 may download only the preview and may provide a service such that the receiver may view the preview and then directly determine whether to and/or when to download original multimedia data. As another example, when the receiver terminal 320 is connected to the slow 3G network and the receiver is not currently using the receiver terminal 320, the receiver terminal 320 may receive only a message event and may notify the receiver that the message is received. Here, in response to a change in the user context, for example, when the receiver is using the receiver terminal 320 or when the receiver terminal 320 is connected to fast WiFi, the receiver terminal 320 may download the preview and/or the original multimedia data. In detail, the receiver terminal 320 may download and provide the preview in response to recognizing that the receiver starts to use the receiver terminal 320, such that the receiver may directly determine whether to and/or when to download original multimedia data. Alternatively, the receiver terminal 320 may download the original multimedia data in response to recognizing a change in a network to which the receiver terminal 320 is connected from the 3G network to WiFi.

Also, with respect to transmission data having a transmission history, the sender terminal 310 may prevent or reduce retransmission of the same or similar transmission data by transmitting an identifier of the transmission data to the messenger server 330. For example, the sender terminal 310 may transmit an identifier of transmission data having a transmission history to the messenger server 330 and the messenger server 330 may verify whether the transmission data corresponding to the received identifier is previously transmitted to and stored in the messenger server 330. Here, when the transmission data corresponding to the received identifier is stored in the messenger server 330, the messenger server 330 may provide a multimedia message to the receiver terminal 320 based on the transmission data stored in the messenger server 330, instead of receiving the transmission data from the sender terminal 310. When the transmission data corresponding to the identifier is absent in the messenger server 330, the messenger server 330 may request the sender terminal 310 to upload the corresponding transmission data. Likewise, with respect to the transmission data that is previously transmitted to the receiver terminal 320 based on the transmission history of the transmission data, the messenger server 330 may provide the identifier of the transmission data to the receiver terminal 320 and may prevent the receiver terminal 320 from redundantly downloading the transmission data or reduce the occurrence of redundant downloading of the transmission data. In this case, the messenger server 330 may transmit, to the receiver terminal 320, the identifier of transmission data that is to be transmitted to the receiver terminal 320. Here, the receiver terminal 320 may verify whether the corresponding transmission data is stored in the receiver terminal 320 based on the transmitted identifier. When the transmission data is stored in the receiver terminal 320, the receiver terminal 320 may display the multimedia message based on the stored transmission data. When the transmission data is not stored in the receiver terminal 320, the receiver terminal 320 may request the messenger server 330 for the transmission data corresponding to the identifier.

Also, as described above, the sender terminal 310 may analyze various user contexts, for example, a network state of the sender terminal 310, a network state of the receiver terminal 320, whether the receiver is using the receiver terminal 320, accessibility thereto, and/or intensity of use immersion, and may transmit the multimedia message using different transmission methods based on the analysis result. For example, when the network state of the sender terminal 310 is 'good', the network state of the receiver terminal 310 is 'good', and the receiver is using the receiver terminal 310, the sender terminal 310 may immediately or contemporaneously transmit a multimedia message that includes original multimedia data. On the contrary, when the network state of sender terminal 310 is 'good', the network state of the receiver terminal 310 is 'poor', and the receiver is using the receiver terminal 310, the sender terminal 310 may transmit a multimedia message that includes a preview of original multimedia data. Here, in response to a request from the receiver that receives the preview of the original multimedia data, the request may be transmitted to the sender terminal 310 through the messenger server 330. Here, the sender terminal 310 may transmit the original multimedia data to the receiver terminal 320 through the messenger server 330. As another example, when the network state of sender terminal 310 is 'poor', the network state of the receiver terminal 310 is 'poor', and the receiver is estimated to use the receiver terminal 310 'after 1 hour', the sender terminal 310 may transmit only a message event to the sender terminal 310 through the messenger server 330. In response to a subsequent change in the user context of the sender and/or the receiver, the receiver terminal 310 may transmit the preview or the original multimedia data to the receiver terminal 320 through the messenger server 330. The transmission method may be determined by the messenger server 330 in the aforementioned manner. For example, in a situation in which only the message event is transmitted, the messenger server 330 may collect information on the user context from each of the sender terminal 310 and the receiver terminal 320 and may request the sender terminal 310 to upload the preview or the original multimedia data in response to a change in the collected user context.

Hereinafter, an example of an inference method of determining, by the messenger server 330, a transmission method, for example, transmission content and transmission time, will be described. For example, the messenger server 330 may determine the transmission method based on transmission urgency and intensity of immersion into content. Here, the transmission urgency may have importance over that of the intensity of immersion into content. For example, when the receiver directly requests original multimedia data, the messenger server 330 may directly transmit the original multimedia data to the receiver terminal 320 regardless of other factors such as content or capacity of the original multimedia data. On the contrary, when an event for the multimedia message is provided to the receiver and no request for the original multimedia data is received from the receiver, the messenger server 330 may transmit only the preview of the original multimedia data.

In some example embodiments, the transmission urgency may be proportional to a network state. For example, when the network state is "poor", the transmission urgency is low and thus, transmission of the original multimedia data may be postponed as late as possible.

The intensity of immersion into content may be proportional to the aforementioned accessibility of the receiver to the receiver terminal 320, whether the receiver is using the receiver terminal 320, and/or intensity of use immersion of the receiver into the receiver terminal 320. For example, when the receiver is using a messenger application with holding the receiver terminal 320 with a hand and has a history of using the receiver terminal 320 for relatively long hours at a current place/time, the intensity of use immersion may have a maximum or upper limit value. The transmission urgency and the intensity of immersion into content may be calculated from each of the contexts. For example, a probabilistic classification model or a non-probabilistic classification model may be used as classification method using machine learning.

A naive Bayes classification model may be used for the probabilistic classification model. The naive Bayes classification model may be a type of a probability classifier based on applying Bayes' theorem with independency assumption between features.

Naive Bayes refers to a conditional probability model, given an instance to be classified, represented as a vector $x=(x_1, \ldots, x_n)$ representing N features, and a naive Bayes classifier assigns k possible outcomes or classes using the vector, as represented as Equation 1.

$$p(C_k | x_1, \ldots, x_n) \qquad \text{[Equation 1]}$$

In Equation 1, if a number of features N is larger or if a single feature may have a large number of values, a Bayesian model may not be immediately or contemporaneously applied to a probability table. Therefore, using Bayes' theorem, the conditional probability of Equation 1 may be decomposed as Equation 2.

$$p(C_k | x) = \frac{p(C_k) p(x | C_k)}{p(x)}. \qquad \text{[Equation 2]}$$

Using Bayesian probability terminology, Equation 2 may be represented as Equation 3.

$$\text{posterior} = \frac{\text{prior} \times \text{likelihood}}{\text{evidence}}. \qquad \text{[Equation 3]}$$

In Equation 3, 'posterior' denotes a post probability, and 'prior' denotes a prior probability, 'likelihood' denotes a probability, and 'evidence' denotes an observance value.

In practice, in Equation 3, there is in interest only in a numerator portion, because a denominator portion does not depend on C and values $F_i$ of features are given, so that the denominator may be effectively constant. The numerator portion is equivalent to a joint probability model of Equation 4.

$$p(C_k, x_1, \ldots, x_n) \qquad \text{[Equation 4]}$$

Here, using a chain rule for repeated applications of the conditional probability, Equation 4 may be rewritten as Equation 5.

$$\begin{aligned} p(C_k, x_1, \ldots, x_n) &= p(C_k) p(x_1, \ldots, x_n | C_k) \\ &= p(C_k) p(x_1 | C_k) p(x_2, \ldots, x_n | C_k, x_1) \\ &= p(C_k) p(x_1 | C_k) p(x_2 | C_k, x_1) p(x_3, \ldots, x_n | C_k, x_1, x_2) \\ &= p(C_k) p(x_1 | C_k) p(x_2 | C_k, x_1) \ldots p(x_n | C_k, x_1, x_2, x_3, \ldots, x_{n-1}) \end{aligned} \qquad \text{[Equatio}$$

The conditional independence of naive Bayes may be represented as Equation 6.

$$p(x_i | C_k, x_j) = p(x_i | C_k),$$

$$p(x_i | C_k, x_j, x_k) = p(x_i | C_k),$$

$$p(x_i | C_k, x_j, x_k, x_l) = p(x_i | C_k), \qquad \text{[Equation 6]}$$

Here, when category type C is given, some feature $F_i$ is conditional independence for every other feature $F_j$ ($j \neq i$). That is, Equation 6 is established for k and l where $j \neq i$. Based thereon, the joint model may be expressed as Equation 7.

$$p(C_k \mid x_1, \ldots, x_n) \propto p(C_k, x_1, \ldots, x_n) \quad \text{[Equation 7]}$$
$$\propto p(C_k)\, p(x_1 \mid C_k)\, p(x_2 \mid C_k)\, p(x_3 \mid C_k) \ldots$$
$$\propto p(C_k) \prod_{i=1}^{n} p(x_i \mid C_k).$$

Under the independence assumption of Equation 7, a conditional distribution over the class variable C may be represented as Equation 8.

$$p(C_k \mid x_1, \ldots, x_n) = \frac{1}{Z} p(C_k) \prod_{i=1}^{n} p(x_i \mid C_k) \quad \text{[Equation 8]}$$

In Equation 8, Z=p(x) denotes a scaling factor dependent only on $x_1, \ldots x_n$, that is, a constant if values of feature variables are known.

The naive Bayes classification combines the probability model with a decision rule. One common rule is to select hypothesis that is most probable. This selects a maximum a posterior or MAP decision rule. That is, the naive Bayes classification finds a class k, that is, class k having the maximum probability for $C_k$ according to Equation 9.

$$\hat{y} = \operatorname*{argmax}_{k \in \{1, \ldots, K\}} p(C_k) \prod_{i=1}^{n} p(x_i \mid C_k). \quad \text{[Equation 9]}$$

For example, with the assumption that a context according to each piece of collected contextual information, for example, a network state of each of the sender terminal 310 and the receiver terminal 320, whether the receiver is using the receiver terminal 320, intensity of use immersion thereinto, accessibility thereto, a hand using a device, position information of the receiver terminal 320, and/or geographical position information, is independent, the messenger server 330 may collect a number of times an event occurs with respect to each of the contexts. Also, the messenger server 330 may generate an event model by calculating an occurrence probability based on the number of times the corresponding event occurs and by calculating a probability that an individual context may occur with respect to a desired result value. The messenger server 330 may input a context event for a test and may estimate a result value through the generated event model.

Meanwhile, a support vector machine (SVM) may be used as a non-probabilistic classification model. The SVM refers to a map learning model for pattern recognition and data analysis as a field of machine learning and is generally used for classification and regression analysis. When a set of data belonging to one of the two categories is given, an SVM algorithm generates a non-probabilistic binary linear classification model configured to determine a category to which new data is to belong based on the given set of data. The generated classification model is represented as a boundary in a data mapped space and the SVM algorithm finds a boundary having a largest width. The SVM may also be used for nonlinear classification in addition to linear classification. To perform the nonlinear classification, the given data is mapped to a high-dimensional feature space. The kernel trick (e.g., kernel function) may be used to efficiently perform the above operation.

The messenger server 330 may consecutively classify a set of data, for example, vectors of data, which is the collected contextual information, into categories, may determine transmission urgency and intensity of immersion into content as a context, for example, a category, corresponding to the set of data, and may determine a transmission method, for example, transmission content and/or a transmission time/point in time, based on the determined context.

As a similar method, the messenger server 330 may calculate future transmission urgency and intensity of immersion into content using a future estimation about the collected contextual information. For example, the messenger server 330 may estimate contextual information such as a network state, accessibility, and/or availability after 1 hour, and may calculate transmission urgency and/or intensity of immersion into content corresponding to the after-1-hour context. In this case, the messenger server 330 may determine a transmission method, for example, transmission content and/or transmission time, of a multimedia message based on current transmission urgency and/or intensity of immersion into content and/or an estimated change tendency, for example, increase, decrease, or no change, in the transmission urgency and/or intensity of immersion into content that are estimated for the future. For example, the messenger server 330 may transmit only an event for the multimedia message to the receiver terminal 320 at a current point in time based on the determined transmission content and transmission point in time and may wait for 1 hour until a change in the context occurs and then transmit an original multimedia message. As another example, the messenger server 330 may determine a transmission method of generating a preview of original multimedia data and transmitting the preview to the sender terminal 310 and transmitting only the event for the multimedia message to the receiver terminal 320. As another example, the messenger server 330 may determine a transmission method of receiving original multimedia data from the sender terminal 310 and generating, using the messenger server 330, a preview and transmitting the preview to the receiver terminal 320 and then, in response to a request from the receiver terminal 320 for original multimedia data, transmitting the original multimedia data from the messenger server 330 to the receiver terminal 320.

Figure 8:
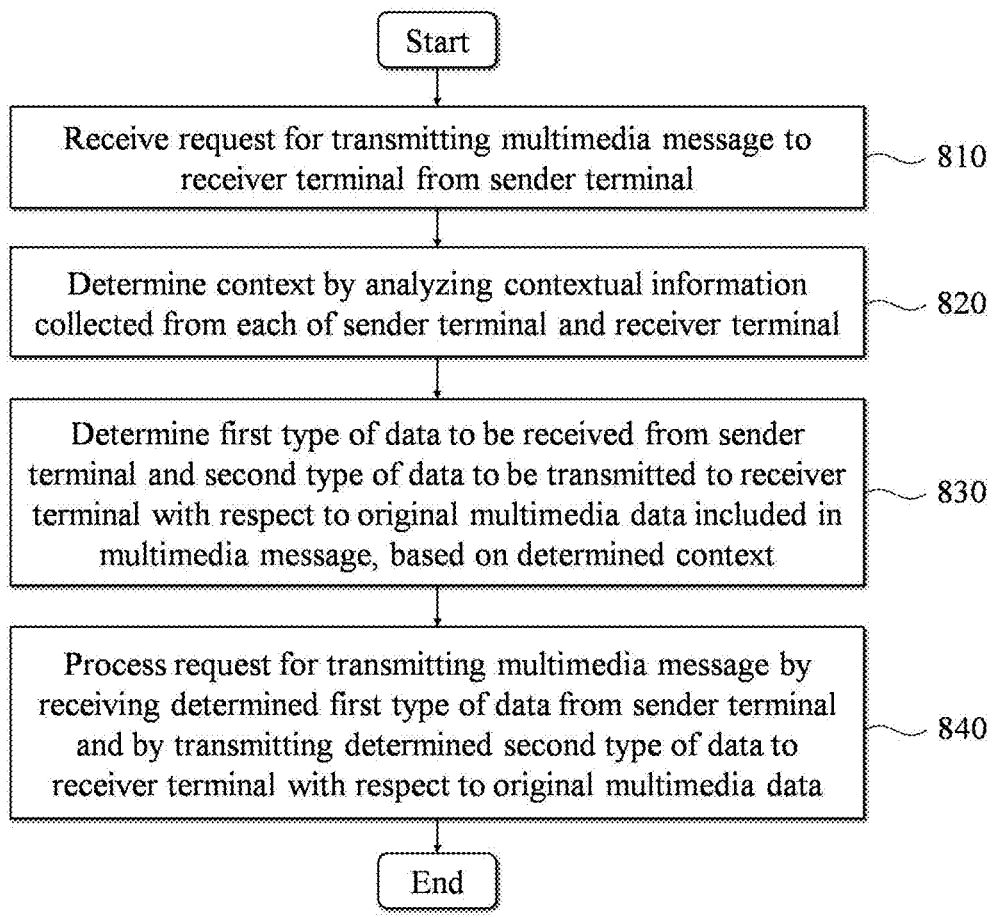
FIG. 8 is a flowchart illustrating an example of a multimedia message providing method of a messenger server according to at least one example embodiment.

FIG. 8 is a flowchart illustrating an example of a multimedia message providing method of a messenger server according to at least one example embodiment. The multimedia message providing method according to some example embodiments may be performed by the computer apparatus 200 that implements the messenger server 330. For example, the processor 220 of the computer apparatus 200 may be configured to execute an instruction according to a code of at least one program or a code of an OS included in the memory 210. Here, the processor 220 may control the computer apparatus 200 to perform operations 810 to 840 included in the multimedia message providing method of FIG. 8 in response to a control instruction provided from the code stored in the computer apparatus 200. Hereinafter, a process of performing, by the messenger server 330, operations 810 to 840 will be described with reference to FIG. 8.

Referring to FIG. 8, in operation 810, the messenger server 330 may receive a request for transmitting a multimedia message to a receiver terminal from a sender terminal. For example, the sender terminal and the receiver terminal may correspond to the sender terminal 310 and the receiver terminal 320, respectively. In a general messenger service, the sender terminal merely transmits a multimedia message including original multimedia data to the messenger server 330. According to some example embodiments, since a method of transmitting the original multimedia data from the sender terminal is determined by the messenger server 330, the request for transmitting the multimedia message prior to transmitting the original multimedia data may be received by the messenger server 330.

In operation 820, the messenger server 330 may determine a context by analyzing contextual information collected from each of the sender terminal and the receiver terminal. The collected contextual information may include, for example, information on at least two of a network state of the sender terminal, a network state of the receiver terminal, whether a receiver is using the receiver terminal, accessibility thereto, intensity of use immersion thereinto, and an original copy request that is received from the receiver terminal in response to an explicit input from the receiver. Such each piece of individual contextual information and context determined based on the contextual information are described above and thus, a further description is omitted here.

In operation 830, the messenger server 330 may determine a first type of data to be received from the sender terminal and a second type of data to be transmitted to the receiver terminal with respect to original multimedia data included in the multimedia message, based on the determined context. For example, the first type of data may include one of the original multimedia data and/or a preview of the original multimedia data. Also, the second type of data may include one of an event for transmitting the multimedia message, the original multimedia data, and/or the preview of the original multimedia data. Here, in at least one context determined by the messenger server 330, the first type of data and the second type of data may be determined to be different data. For example, as described above with reference to FIG. 3, although the messenger server 330 receives original multimedia data from the sender terminal as the first type of data, the messenger server 330 may generate the preview of the original multimedia data and may transmit the preview as the second type of data for the receiver terminal of which the network state is 'poor'. That is, data received by the messenger server 330 from the sender terminal and data transmitted from the messenger server 330 to the receiver terminal may differ depending on the determined context.

In operation 840, the messenger server 330 may process the request for transmitting the multimedia message by receiving the determined first type of data from the sender terminal and by transmitting the determined second type of data to the receiver terminal with respect to the original multimedia data. As described above, in the case of transferring the multimedia message including the original multimedia data between the sender terminal and the receiver terminal, the messenger server 330 may determine a type of received data and/or transmitted data for the original multimedia data based on the context that is determined based on the contextual information collected from the sender terminal and the receiver terminal and may perform transmission. Accordingly, it is possible to further efficiently transmit, receive, and/or display the multimedia message.

Also, when the determined context varies in response to a change in the collected contextual information, the messenger server 330 may change at least one of the first type and the second type based on the changed context. In this case, the messenger server 330 may further receive the changed first type of data from the sender terminal or may further transmit the changed second type of data to the receiver terminal.

Figure 9:
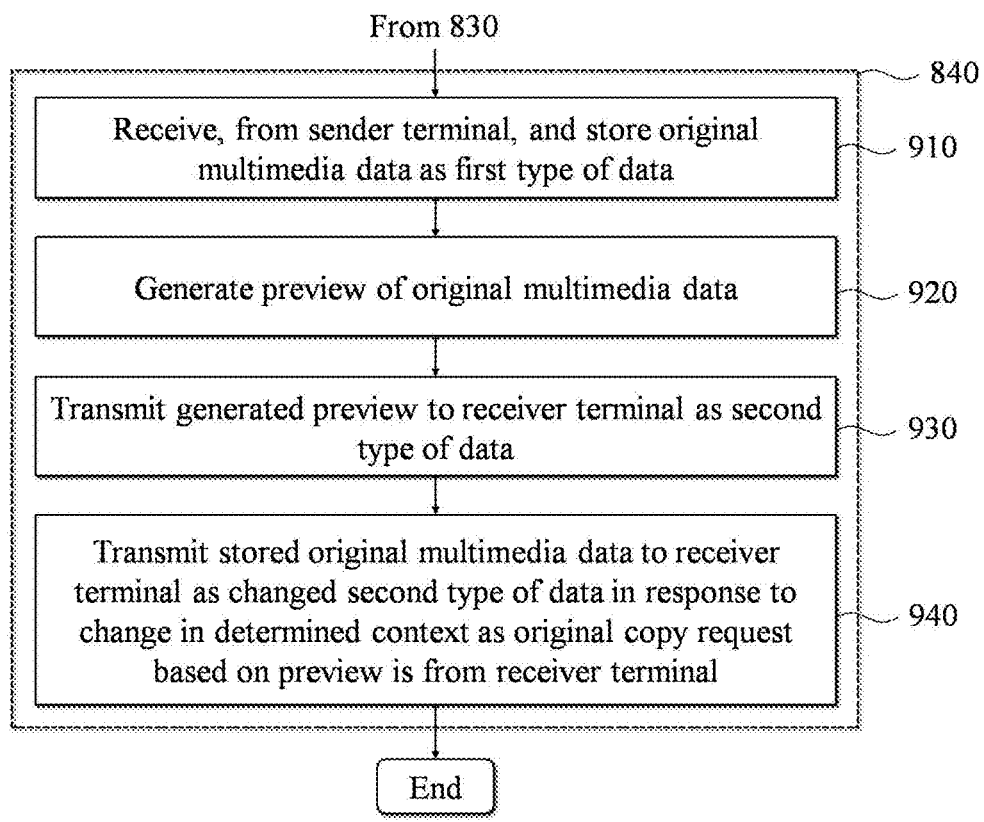
FIG. 9 is a flowchart illustrating a first example of processing a request for transmitting a multimedia message according to at least one example embodiment.

FIG. 9 is a flowchart illustrating a first example of processing a request for transmitting a multimedia message according to at least one example embodiment. Operations 910 to 940 of FIG. 9 may be included in operation 840 of FIG. 8 and thereby performed. For example, as described above with reference to FIG. 3, the example of FIG. 9 may relate to a case in which a network state of the sender terminal is 'good', a network state of the receiver terminal is 'poor', whether a receiver is using the receiver terminal is 'yes', and intensity of use immersion is 'high'. That is, an example of an operation of the messenger server 330 in a case in which transmission urgency of the sender terminal is high, transmission urgency to the receiver terminal is low, and intensity of immersion into content is high will be described with reference to FIG. 9.

Referring to FIG. 9, in operation 910, the messenger server 330 may receive, from the sender terminal, and store, the original multimedia data as the first type of data. For example, an example in which the sender terminal uploads original multimedia data and accordingly, the messenger server 330 receives and stores the uploaded original multimedia data based on the transmission method determined by the messenger server 330 is described with reference to FIG. 3.

In operation 920, the messenger server 330 may generate a preview of the original multimedia data. For example, as described above with FIGS. 4 and 5, a variety of original multimedia data may be generated as previews based on a plurality of grades and/formats. In detail, a context determined by the messenger server 330 may include sub-contexts, and the sub-contexts may be generated as previews of different grades and/formats.

In operation 930, the messenger server 330 may transmit the generated preview to the receiver terminal as the second type of data. For example, as described above with reference to FIG. 3, although the messenger server 330 receives original multimedia data from the sender terminal, the messenger server 330 may transmit a preview of the original multimedia data for the receiver terminal with a 'poor' network state instead of transmitting the original multimedia data.

In operation 940, the messenger server 330 may transmit the stored original multimedia data to the receiver terminal as the changed second type of data in response to a change in the determined context as an original copy request based on the preview is received from the receiver terminal. That is, although the messenger server 330 transmits the preview to the receiver terminal based on the existing context, the receiver may request the original multimedia data, which leads to changing the context (for example, in response to determining that the network state of the receiver terminal has changed from 'poor' to 'good'). That is, the messenger server 330 may further transmit the original multimedia data in response to the changed context.

Figure 10:
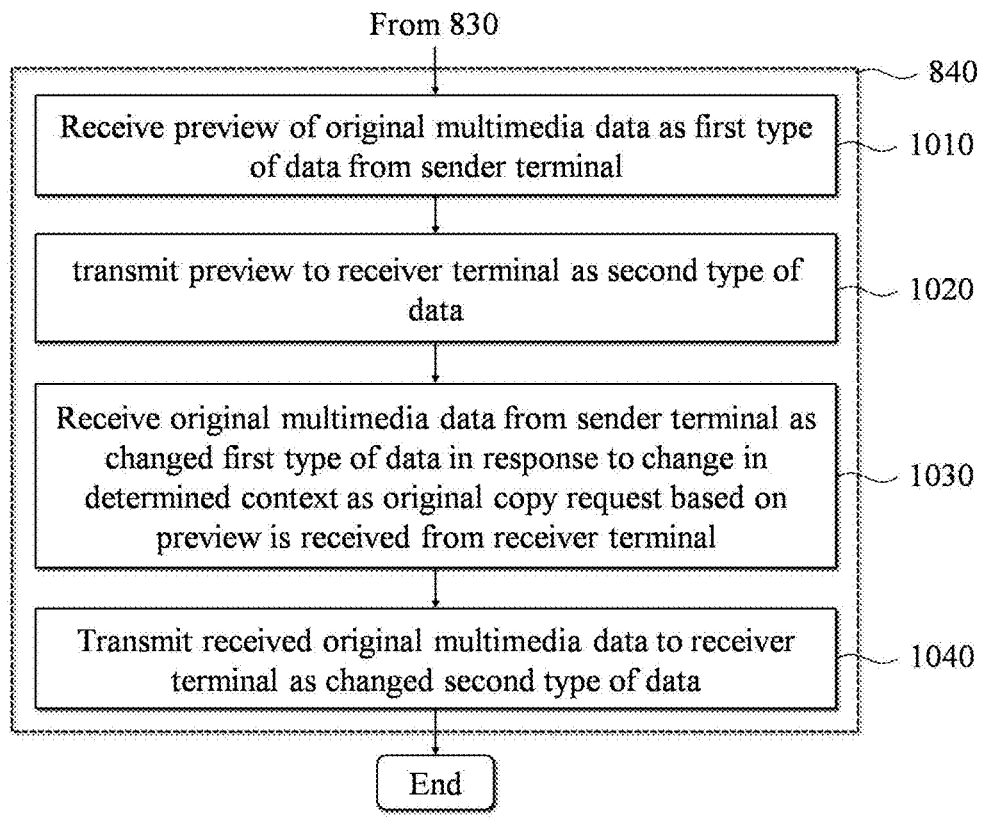
FIG. 10 is a flowchart illustrating a second example of processing a request for transmitting a multimedia message according to at least one example embodiment.

FIG. 10 is a flowchart illustrating a second example of processing a request for transmitting a multimedia message according to at least one example embodiment. Operations 1010 to 1040 of FIG. 10 may be included in operation 840 of FIG. 8 and thereby performed. The example of FIG. 10 may relate to a case in which a network state of the sender terminal is 'poor' and a network state of the receiver terminal is 'good'. That is, an example of an operation of the messenger server 330 in a case in which transmission urgency to the sender terminal is low and transmission urgency to the receiver terminal is high will be described with reference to FIG. 10.

In operation 1010, the messenger server 330 may receive a preview of the original multimedia data as the first type of data from the sender terminal. As described above, since the transmission urgency to the sender terminal is low, relatively small capacity data, such as the preview, may be received before the original multimedia data is initially received from the sender terminal.

In operation 1020, the messenger server 330 may transmit the preview to the receiver terminal as the second type of data.

In operation 1030, the messenger server 330 may receive the original multimedia data from the sender terminal as the changed first type of data in response to a change in the determined context as an original copy request based on the preview is received from the receiver terminal.

In operation 1040, the messenger server 330 may transmit the received original multimedia data to the receiver terminal as the changed second type of data.

Here, that the original copy request is received at the receiver terminal may indicate that that a context of transmission urgency to the receiver terminal is enhanced to be highest. Accordingly, the messenger server 330 may prioritize the transmission urgency of the receiver terminal and may receive the original multimedia data from the sender terminal and transmit the received original multimedia data to the receiver terminal.

Figure 11:
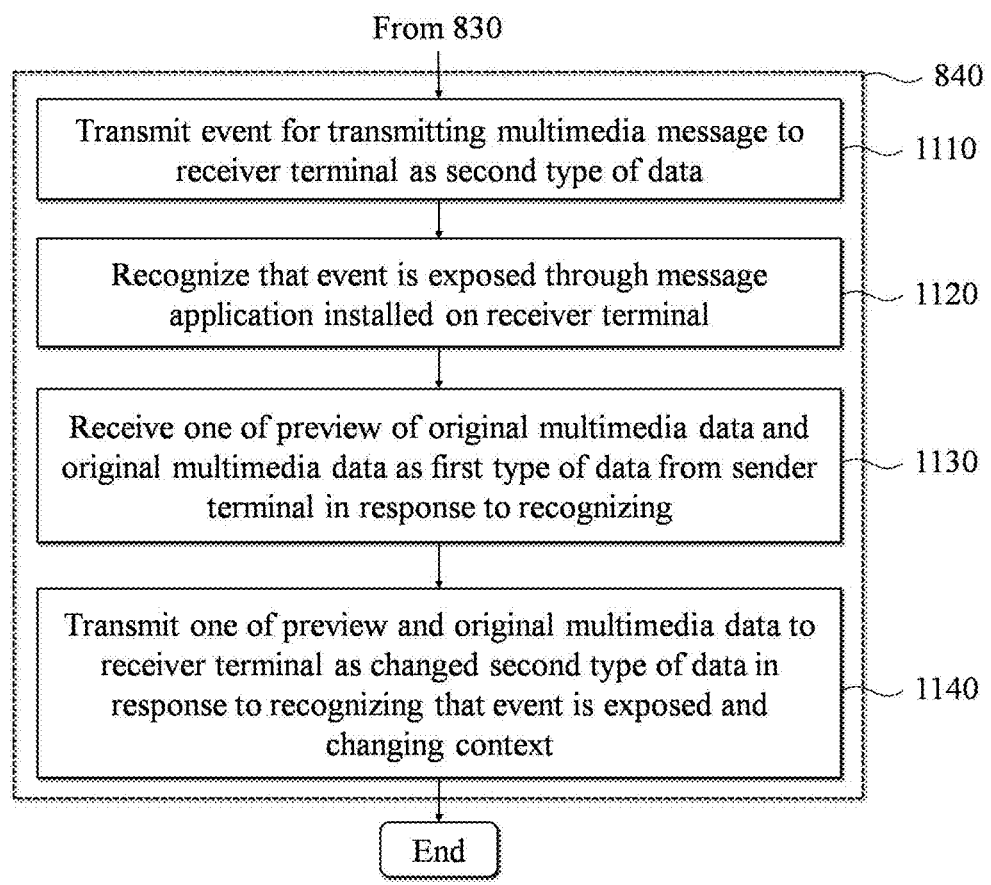
FIG. 11 is a flowchart illustrating a third example of processing a request for transmitting a multimedia message according to at least one example embodiment.

FIG. 11 is a flowchart illustrating a third example of processing a request for transmitting a multimedia message according to at least one example embodiment. Operations 1110 to 1140 of FIG. 11 may be included in operation 840 of FIG. 8 and thereby performed. The example of FIG. 11 may relate to a case in which transmission urgency to the sender terminal is low since a network state of the sender terminal is 'poor', transmission urgency to the receiver terminal is low since a network state of the receiver terminal is 'poor', whether the receiver is using the receiver terminal is 'no', and intensity of use immersion is also 'low', and intensity of immersion into content is also low.

Referring to FIG. 11, in operation 1110, the messenger server 330 may transmit an event for transmitting a multimedia message to the receiver terminal as the second type of data. Since the request for transmitting the multimedia message is transmitted from the sender terminal to the messenger server 330 in operation 810 of FIG. 8, the messenger server 330 may not receive the event from the sender terminal. The messenger server 330 may simply transmit, to the receiver terminal, only a notification event indicating that the request for transmitting the multimedia message is received from the sender.

In operation 1120, the messenger server 330 may recognize that the event is exposed (e.g., displayed and/or viewed) through a message application installed on the receiver terminal. Such recognition of the event exposure may indicate that the receiver is using the receiver terminal and may indicate a change in the context, such as an increase in the intensity of immersion into content on the receiver side.

In operation 1130, the messenger server 330 may receive one of the preview of the original multimedia data and/or the original multimedia data as the first type of data from the sender terminal in response to the recognizing (for example, the messenger server 330 may request the original multimedia data from the sender terminal in response to the recognizing).

In operation 1140, the messenger server 330 may transmit one of the preview and/or the original multimedia data to the receiver terminal as the changed second type of data in response to a change in the determined context according to recognizing that the event is exposed. Here, the messenger server 330 may receive the original multimedia data from the sender terminal as the changed first type of data, in response to an additional change in the context as an original copy request based on the preview is received from the receiver terminal when the preview is received from the sender terminal and transmitted to the receiver terminal, and may transmit the received original multimedia data to the receiver terminal as the additionally changed second type of data.

That is, in response to an increase in the intensity of immersion into content on the receiver side, the messenger server 330 may receive one of the preview and the original multimedia data from the sender terminal and may transmit the same to the receiver terminal. Here, since the transmission urgency is low, the messenger server 330, if possible, may initially transmit the preview to the receiver terminal and subsequently provide the original multimedia data to the receiver terminal in response to an explicit request from the receiver.

According to some example embodiments, the messenger server 330 may further efficiently transmit the multimedia message depending on various contexts.

Figure 12:
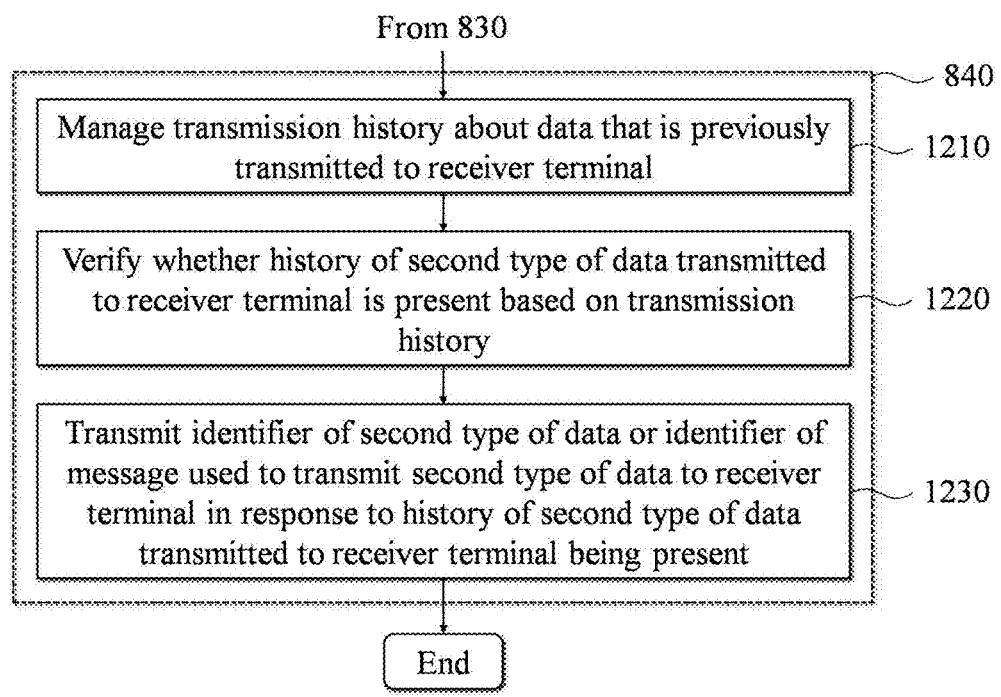
FIG. 12 is a flowchart illustrating an example of preventing or reducing a redundant transmission of data to be transmitted to a receiver terminal according to at least one example embodiment.

FIG. 12 is a flowchart illustrating an example of preventing or reducing a redundant transmission of data to be transmitted to a receiver terminal according to at least one example embodiment. Operations 1210 to 1230 of FIG. 12 may be included in operation 840 and thereby performed, and, substantially, may be performed in parallel with operations 810 to 840 of FIG. 8 every time the messenger server 330 transmits data to the receiver terminal.

Referring to FIG. 12, in operation 1210, the messenger server 330 may manage a transmission history including data (e.g., multimedia) that is previously transmitted to the receiver terminal. For example, the messenger server 330 may manage a history of a type or an identifier of data transmitted to the receiver terminal, and a time at which the data is transmitted to the receiver terminal.

In operation 1220, the messenger server 330 may verify whether a history of the second type of data transmitted to the receiver terminal is present based on the transmission history.

In operation 1230, the messenger server 330 may transmit an identifier of the second type of data or an identifier of a message used to transmit the second type of data to the receiver terminal in response to the history of the second type of data transmitted to the receiver terminal being present. Here, data that is previously transmitted to and stored in the receiver terminal may be identified by the receiver terminal based on the identifier of the data or the identifier of the message. Accordingly, the messenger server 330 may prevent the second type of data from being redundantly transmitted to the receiver terminal or reduce the occurrence of the redundant transmission. When the second type of data is not stored in the receiver terminal, the messenger server 330 may transmit the second type of data to the receiver terminal in response to the request from the receiver terminal. The example of preventing or reducing redundant transmission of data is described above with reference to FIGS. 6 and 7 and thus, a further description is omitted here.

Figure 13:
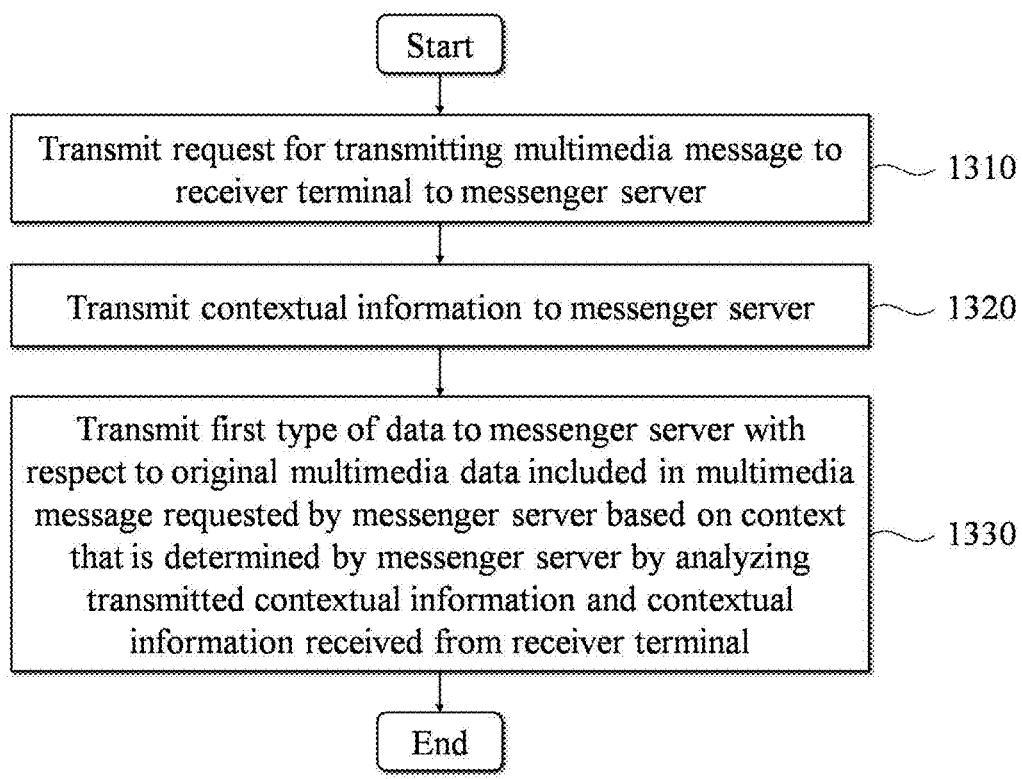
FIG. 13 is a flowchart illustrating an example of a multimedia message providing method of a sender terminal according to at least one example embodiment.

FIG. 13 is a flowchart illustrating an example of a multimedia message providing method of a sender terminal according to at least one example embodiment. The multimedia message providing method of FIG. 13 may be performed by the computer apparatus 200 that implements the sender terminal 310. For example, the processor 220 of the computer apparatus 200 may be configured to execute a control instruction according to a code of at least one program or a code of an OS included in the memory 210. Here, the processor 220 may control the computer apparatus 200 to perform operations 1310 to 1330 included in the multimedia message providing method of FIG. 13 in response to the control instruction provided from the code stored in the computer apparatus 200. A process of performing, by the sender terminal 310, operations 1310 to 1330 will be described with reference to FIG. 13.

Referring to FIG. 13, in operation 1310, the sender terminal 310 may transmit a request for transmitting a multimedia message to a receiver terminal to a messenger server. Here, the messenger server may correspond to the aforementioned messenger server 330. As described above, in a general messenger service, the sender side merely transmits a multimedia message including original multimedia data to the messenger server 330 immediately or contemporaneously. According to some example embodiments, since a method of transmitting the original multimedia data from the sender terminal 310 is determined by the messenger server, the messenger server may receive a request for transmitting the multimedia message prior to transmitting the original multimedia data.

In operation 1320, the sender terminal 310 may transmit contextual information to the messenger server. For example, the transmitted contextual information may include information on a network state of the sender terminal 310.

In operation 1330, the sender terminal 310 may transmit a first type of data to the messenger server with respect to original multimedia data included in the multimedia message requested by the messenger server based on a context that is determined by the messenger server by analyzing the transmitted contextual information and contextual information received from the receiver terminal. Here, the contextual information received from the receiver terminal may include, for example, at least one of a network state of the receiver terminal, whether the receiver is using the receiver terminal, accessibility thereto, intensity of use immersion thereinto, and/or an original copy request that is received from the receiver terminal in response to an explicit or implied input of the receiver. Meanwhile, the first type of data may include one of the original multimedia data and/or a preview of the original multimedia data. The second type of data that is determined based on one of an event for transmitting the multimedia message, the original multimedia data, and/or the preview of the original multimedia data may be transmitted from the messenger server to the receiver terminal. The first type of data and the second type of data may be determined to differ from each other based on the at least context determined by the messenger server.

As described above, the first type may be changed based on the changed context in response to a change in the context that is determined by the messenger server as one of the transmitted contextual information and/or the contextual information received from the receiver terminal changes over time. In this case, the sender terminal 310 may further transmit the changed first type of data to the messenger server.

Also, to prevent or reduce redundant transmission of data, the sender terminal 310 may manage a transmission history about data that is transmitted to the messenger server. Here, the sender terminal 310 may verify whether a history of the first type of data transmitted to the messenger server is present based on the transmission history, and may transmit an identifier of the first type of data and/or an identifier of a message used to transmit the first type of data to the messenger server in response to the history of the first type of data transmitted to the messenger server being present. In this case, data that is previously transmitted to and stored in the messenger may be identified by the messenger based on the identifier of the data or the identifier of the message. Accordingly, the redundant transmission of first type of data may be prevented or reduced.

Matters not described in FIG. 13 may refer to the aforementioned description.

According to some example embodiments, it is possible to further efficiently transmit, receive, and/or display a multimedia message based on a context of each of a sender and a receiver of a message at a messenger service.

The systems and or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments, or vice versa.

The foregoing description has been provided for purposes of illustration and description. It is not intended to be exhaustive or to limit the disclosure. Individual elements or features of some example embodiments are generally not limited, but, where applicable, are interchangeable and can be used in some example embodiments, even if not specifically shown or described. The same may also be varied in many ways. Such variations are not to be regarded as a departure from the disclosure, and all such modifications are intended to be included within the scope of the disclosure.

What is claimed is:

1. A method performed by a computer apparatus for providing a multimedia message, the method comprising:
   receiving a request, from a sender terminal, for transmitting a multimedia message including multimedia data to a receiver terminal;
   determining a first context by analyzing first contextual information collected from each of the sender terminal and the receiver terminal in response to receiving the request;
   determining a first type of the multimedia data to be received from the sender terminal and a second type of the multimedia data to be transmitted to the receiver terminal based on the determined first context, both the first type of the multimedia data and the second type of the multimedia data being based on original multimedia data of the multimedia data, the first type of the multimedia data being determined as one of the original multimedia data or a preview of the original multimedia data; and
   processing the request for transmitting the multimedia message after the determining the first type of the multimedia data and the second type of the multimedia data, the processing the request including
      receiving the multimedia message including the determined first type of the multimedia data from the sender terminal, and
      transmitting the multimedia message including the determined second type of the multimedia data to the receiver terminal.

2. The method of claim 1, wherein the collected first contextual information comprises at least two of
   a network data rate of the sender terminal,
   a network data rate of the receiver terminal,
   whether a receiver user is using the receiver terminal,
   accessibility of the receiver terminal,
   intensity of use immersion of the receiver user, or
   an original copy request received from the receiver terminal in response to an explicit input of the receiver user.

3. The method of claim 1, wherein,
   the second type of the multimedia data includes one of an event notification, the original multimedia data, or the preview of the original multimedia data, and
   the first type of the multimedia data and the second type of the multimedia data are different.

4. The method of claim 1, further comprising:
   determining a second context by analyzing second contextual information collected from each of the sender terminal and the receiver terminal after determining the first context;
   changing the first type of the multimedia data to a third type of the multimedia data or the second type of the multimedia data to a fourth type of the multimedia data in response to determining the second context is different from the first context; and
   performing at least one of
      receiving the third type of the multimedia data from the sender terminal, or
      transmitting the fourth type of the multimedia data to the receiver terminal.

5. The method of claim 4, wherein the processing the request comprises:
   receiving the original multimedia data from the sender terminal as the first type of the multimedia data;
   storing the original multimedia data;
   generating the preview of the original multimedia data;
   transmitting the generated preview to the receiver terminal as the second type of the multimedia data; and
   transmitting the stored original multimedia data to the receiver terminal as the fourth type of the multimedia data in response to determining the second context is different from the first context based on receiving an original copy request from the receiver terminal corresponding to the transmitted preview.

6. The method of claim 4, wherein the processing of the request comprises:
   receiving the preview of the original multimedia data as the first type of the multimedia data from the sender terminal;
   transmitting the preview to the receiver terminal as the second type of the multimedia data;
   receiving the original multimedia data from the sender terminal as the third type of the multimedia data in response to determining the second context is different from the first context based on receiving an original copy request from the receiver terminal corresponding to the transmitted preview; and
   transmitting the received original multimedia data to the receiver terminal as the fourth type of the multimedia data.

7. The method of claim 4, wherein the processing of the request comprises:
   transmitting an event notification to the receiver terminal as the second type of the multimedia data, the event notification corresponding to the multimedia message;
   determining the second context is different from the first context based on determining that the event notification has been displayed through a message application installed on the receiver terminal;
   receiving one of the preview of the original multimedia data or the original multimedia data as the third type of the multimedia data from the sender terminal in response to determining the second context is different from the first context; and
   transmitting one of the preview or the original multimedia data to the receiver terminal as the fourth type of the multimedia data in response to determining the second context is different from the first context.

8. The method of claim 7, further comprising:
determining a third context by analyzing third contextual information collected from each of the sender terminal and the receiver terminal after determining the second context;
determining the third context is different from the second context based on determining an original copy request from the receiver terminal corresponding to the transmitted preview has been received from the receiver terminal;
changing the third type of the multimedia data to a fifth type of the multimedia data or the fourth type of the multimedia data to a sixth type of the multimedia data in response to determining the third context is different from the second context, the third type of the multimedia data being the preview, the fourth type of the multimedia data being the preview;
receiving the original multimedia data from the sender terminal as the fifth type of the multimedia data in response to determining the third context is different from the second context; and
transmitting the received original multimedia data to the receiver terminal as the sixth type of the multimedia data.

9. The method of claim 1, further comprising:
determining whether the second type of the multimedia data has previously been transmitted to the receiver terminal based on transmission history data; and
transmitting an identifier of the second type of the multimedia data or an identifier of a message previously used to transmit the second type of the multimedia data to the receiver terminal in response to determining the second type of the multimedia data has previously been transmitted to the receiver terminal,
wherein the transmitted identifier of the second type of the multimedia data or the transmitted identifier of the message enables the receiver terminal to identify data previously transmitted to and stored in the receiver terminal.

10. A non-transitory computer-readable storage medium storing instructions that, when executed by at least one processor, cause the at least one processor to perform the multimedia message providing method of claim 1.

11. A non-transitory computer-readable storage medium storing instructions that, when executed by at least one processor of a sender terminal, cause the at least one processor to perform a multimedia message providing method comprising:
transmitting, by the sender terminal to a messenger server, a request for transmitting a multimedia message including multimedia data to a receiver terminal;
transmitting, by the sender terminal to the messenger server, first contextual information after the transmitting the request, the messenger server being configured to determine a context based on the first contextual information and second contextual information received from the receiver terminal; and
transmitting, by the sender terminal to the messenger server, the multimedia message including a first type of multimedia data based on original multimedia data of the multimedia data after the transmitting the first contextual information, the first type of the multimedia data being requested by the messenger server based on the context, and the first type of the multimedia data being determined as one of the original multimedia data or a preview of the original multimedia data.

12. The non-transitory computer-readable storage medium of claim 11, wherein
the transmitted first contextual information includes a network data rate of the sender terminal, and
the second contextual information received includes at least one of
a network data rate of the receiver terminal,
whether a receiver user is using the receiver terminal,
accessibility of the receiver terminal,
intensity of use immersion of the receiver user, or
an original copy request received from the receiver terminal in response to an explicit input of the receiver user.

13. The non-transitory computer-readable storage medium of claim 11, wherein
a second type of the multimedia data based on the second contextual information and one of an event notification, the original multimedia data, or the preview of the original multimedia data is transmitted from the messenger server to the receiver terminal, and
the first type of the multimedia data and the second type of the multimedia data are different.

14. The non-transitory computer-readable storage medium of claim 11, wherein
the first type of the multimedia data is changed in response to a change in the context, as the change in the context resulting from a change in at least one of the transmitted first contextual information or the second contextual information, and
the multimedia message providing method further comprises transmitting the changed first type of the multimedia data to the messenger server.

15. The non-transitory computer-readable storage medium of claim 11, wherein
the multimedia message providing method further comprises:
determining whether the first type of the multimedia data has previously been transmitted to the messenger server based on transmission history data, and
transmitting an identifier of the first type of the multimedia data or an identifier of a message used to transmit the first type of the multimedia data to the messenger server in response to determining the first type of the multimedia data has previously been transmitted to the messenger server, and
the transmitted identifier of the first type of the multimedia data or the transmitted identifier of the message enables the messenger server to identify data previously transmitted to and stored in the messenger server.

16. A computer apparatus comprising:
at least one processor configured to execute computer-readable instructions to
receive a request, from a sender terminal, for transmitting a multimedia message including multimedia data to a receiver terminal,
determine a context by analyzing contextual information collected from each of the sender terminal and the receiver terminal in response to receiving the request,
determine a first type of the multimedia data to be received from the sender terminal and a second type of the multimedia data to be transmitted to the receiver terminal based on the determined context, both the first type of the multimedia data and the second type of the multimedia data being based on original multimedia data of the multimedia data, the first type of the multimedia data being determined as one of the original multimedia data or a preview of the original multimedia data, and process the request for transmitting the multimedia message after determining the first type of the multimedia data and the second type of the multimedia data, the request being processed by receiving the determined first type of the multimedia data from the sender terminal, and transmitting the determined second type of the multimedia data to the receiver terminal.

17. The computer apparatus of claim 16, wherein the collected contextual information comprises at least two of a network data rate of the sender terminal, a network data rate of the receiver terminal, whether a receiver user is using the receiver terminal, accessibility of the receiver terminal, intensity of use immersion of the receiver user, or an original copy request received from the receiver terminal in response to an explicit input of the receiver user.

18. The computer apparatus of claim 16, wherein the second type of the multimedia data includes one of an event notification, the original multimedia data, or the preview of the original multimedia data, and the first type of the multimedia data and the second type of the multimedia data are different.

19. The computer apparatus of claim 16, wherein the at least one processor is further configured to execute the computer-readable instructions to determining the context has changed based on a change in the contextual information, change at least one of the first type of the multimedia data or the second type of the multimedia data in response to determining the context has changed, and perform at least one of receiving the changed first type of the multimedia data from the sender terminal, or transmitting the changed second type of the multimedia data to the receiver terminal.

20. The method of claim 1, wherein the request for transmitting the multimedia message does not include the multimedia message.

* * * * *